US012291213B2

(12) United States Patent
Mitsutani

(10) Patent No.: US 12,291,213 B2
(45) Date of Patent: *May 6, 2025

(54) INFORMATION PROCESSING DEVICE, METHOD, NON-TRANSITORY STORAGE MEDIUM, AND VEHICLE

(71) Applicant: TOYOTA JIDOSHA KABUSHIKI KAISHA, Toyota (JP)

(72) Inventor: Noritake Mitsutani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,931

(22) Filed: Oct. 11, 2023

(65) Prior Publication Data

US 2024/0043019 A1 Feb. 8, 2024

Related U.S. Application Data

(63) Continuation of application No. 17/405,156, filed on Aug. 18, 2021, now Pat. No. 11,820,388.

(30) Foreign Application Priority Data

Nov. 10, 2020 (JP) ................. 2020-187358

(51) Int. Cl.
*B60W 40/12* (2012.01)
*B60W 10/26* (2006.01)

(52) U.S. Cl.
CPC ............ *B60W 40/12* (2013.01); *B60W 10/26* (2013.01); *B60W 2510/242* (2013.01)

(58) Field of Classification Search
CPC ................. B60W 40/12; B60W 10/26; B60W 2510/242; B60W 2050/0016;
(Continued)

(56) References Cited

U.S. PATENT DOCUMENTS 6,488,609 B1 * 12/2002 Morimoto ............. B60W 10/06
477/181
2001/0037645 A1 11/2001 Morimoto et al.
(Continued)

FOREIGN PATENT DOCUMENTS

DE 102009033752 A1 1/2011
EP 1065087 A2 1/2001
(Continued)

OTHER PUBLICATIONS

Feb. 24, 2023 Office Action issued in U.S. Appl. No. 17/405,156.
Jul. 12, 2023 Notice of Allowance issued in U.S. Appl. No. 17/405,156.

*Primary Examiner* — Yi-Kai Wang
(74) *Attorney, Agent, or Firm* — Oliff PLC

(57) ABSTRACT

An information processing device to be mounted on a vehicle includes a processor. The processor is configured to determine, in response to a request for the vehicle, one mode out of a plurality of modes defining behavior of the vehicle, make transition of a status of the vehicle among a plurality of statuses that is based on a state and a sub-mode, and control the vehicle based on the status of the vehicle that has been achieved by the transition. The state and the sub-mode are permitted in the determined mode.

7 Claims, 25 Drawing Sheets

(58) Field of Classification Search
CPC ......... B60W 30/18054; B60W 30/182; B60W 50/082; B60W 60/0051; B60W 20/15; B60W 50/00; B60W 2050/0043; B60L 2260/22; B60L 2260/26; B60L 50/60; B60L 53/10; B60L 55/00; Y02T 10/62; Y02T 10/70; Y02T 10/7072; Y02T 90/14; Y04S 10/126
USPC ......................................................... 701/36
See application file for complete search history.

(56) References Cited

U.S. PATENT DOCUMENTS

| | | |
|---|---|---|
| 2013/0091565 A1 | 4/2013 | Kafer |
| 2015/0120124 A1 | 4/2015 | Bartels et al. |
| 2018/0009330 A1 | 1/2018 | Ricci |
| 2020/0070830 A1 | 3/2020 | Itabashi et al. |
| 2021/0216361 A1 | 7/2021 | Ishigooka |

FOREIGN PATENT DOCUMENTS

| | | |
|---|---|---|
| EP | 3130516 A1 | 2/2017 |
| JP | 2014-004858 A | 1/2014 |
| JP | 2018-531436 A | 10/2018 |
| JP | 2020-037309 A | 3/2020 |
| WO | 2018/014282 A1 | 1/2018 |
| WO | 2019/239522 A1 | 12/2019 |

\* cited by examiner

FIG. 13

| V2G COOPERATION SYSTEM | AC | | | DC | | | (NO COOPERATION) |
|---|---|---|---|---|---|---|---|
| SUB-MODE COMBINATION | CHARGING: AC CHARGING ⇔ OFF AC POWER SUPPLY: OFF ⇔ OUTDOOR V2G | | | CHARGING: DC CHARGING AC POWER SUPPLY: OFF OR INDOOR ACC | | | OTHER THAN LEFT COMBINATIONS |
| STATE | READY | CHARGE | SUPPLY | READY | CHARGE | SUPPLY | STANDBY |
| AC CHARGER OPERATION | IMPOSSIBLE | POSSIBLE | IMPOSSIBLE | IMPOSSIBLE | IMPOSSIBLE | IMPOSSIBLE | (AS APPROPRIATE) |
| AC-INV OPERATION | IMPOSSIBLE | IMPOSSIBLE | POSSIBLE | POSSIBLE | POSSIBLE | POSSIBLE | (AS APPROPRIATE) |
| DC CHARGING/ DISCHARGING OPERATION | IMPOSSIBLE | IMPOSSIBLE | IMPOSSIBLE | IMPOSSIBLE | (*1) | (*2) | (AS APPROPRIATE) |

FIG. 14

| DETERMI-<br>NATION CONDITION | STATUS | MANUAL | SEMI-AUTOMATIC | FULL-AUTOMATIC |
|---|---|---|---|---|
| DRIVER AUTHENTICATION, SOUNDNESS | | APPLY | APPLY | NOT APPLY |
| OUT-CAR × VERIFICATION BETWEEN VEHICLES | | NOT APPLY | (*1) | (*1) |
| DRIVE SYSTEM RELIABILITY | | APPLY | APPLY | APPLY |
| ADVANCED SAFETY SYSTEM RELIABILITY | | (*2) | APPLY | APPLY |
| DRIVING OPERATION SYSTEM RELIABILITY | | APPLY | APPLY | NOT APPLY |

FIG. 19

| DISCHARGING \ CHARGING | | OFF | AC CHARGING (*6) | DC CHARGING (*6) | NON-CONTACT/ CONTACT (*6) | SOLAR HIGH VOLTAGE (*3) |
|---|---|---|---|---|---|---|
| | OFF | CHARGING/ DISCHARGING | CHARGING/ DISCHARGING | CHARGING/ DISCHARGING | CHARGING/ DISCHARGING | CHARGING/ DISCHARGING |
| EQUIPMENT POWER SUPPLY | ELECTRIC SERVICE | CHARGING/ DISCHARGING | CHARGING/ DISCHARGING | CHARGING/ DISCHARGING | CHARGING/ DISCHARGING OR CHARGING ONLY | DISCHARGING ONLY (*2) |
| | MOVEMENT PREPARATION | CHARGING/ DISCHARGING | CHARGING/ DISCHARGING | CHARGING/ DISCHARGING | CHARGING/ DISCHARGING (*7) | DISCHARGING ONLY (*2) |
| | LOADING AND UNLOADING OF PASSENGERS | CHARGING/ DISCHARGING | CHARGING ONLY | CHARGING ONLY | (CHARGING/ DISCHARGING) | DISCHARGING ONLY (*2) |
| | OTA | CHARGING/ DISCHARGING | CHARGING/ DISCHARGING OR DISCHARGING ONLY (*1) | CHARGING/ DISCHARGING OR DISCHARGING ONLY (*1) | CHARGING/ DISCHARGING OR DISCHARGING ONLY (*8) | DISCHARGING ONLY (*2) |
| AUXILIARY-DEVICE SUPPLEMENTATION | HIGH-VOLTAGE TRANSFER | CHARGING/ DISCHARGING | (CHARGING/ DISCHARGING) (*4) | (CHARGING/ DISCHARGING) (*4) | (CHARGING/ DISCHARGING) (*4) | DISCHARGING ONLY (*2) |
| | SOLAR LOW VOLTAGE | CHARGING/ DISCHARGING | (CHARGING/ DISCHARGING) (*5) | (CHARGING/ DISCHARGING) (*5) | (CHARGING/ DISCHARGING) (*5) | CHARGING ONLY (*2) |

FIG. 20

| AUXILIARY-DEVICE SUPPLEMENTATION / EQUIPMENT POWER SUPPLY | ELECTRIC SERVICE | MOVEMENT PREPARATION | LOADING AND UNLOADING OF PASSENGERS | OTA |
|---|---|---|---|---|
| HIGH-VOLTAGE TRANSFER | CO-EXECUTABLE | CO-EXECUTABLE | CO-EXECUTABLE | PRIORITY ON POWER SUPPLY |
| SOLAR LOW VOLTAGE | (CO-EXECUTABLE) | (CO-EXECUTABLE) | (CO-EXECUTABLE) | PRIORITY ON POWER SUPPLY |

FIG. 21

| CHARGING/ DISCHARGING | | AC POWER SUPPLY | ELECTRIC MODE ||| GENERATOR MODE ||
|---|---|---|---|---|---|---|---|
| | | | INDOOR ACC | OUTDOOR V2G | OUTDOOR V2G | INDOOR V2L | OUTDOOR V2L |
| OFF | | | A | A | A | A | A |
| CHARGING | AC CHARGING | | G | G | F | D | D |
| | DC CHARGING | | G | G | D | D | D |
| | NON-CONTACT | | B | B | D | D | D |
| | CONTACT | | G | G | D | D | D |
| | SOLAR HIGH VOLTAGE | | NOTHING | NOTHING | C | C | C |
| EQUIPMENT POWER SUPPLY | ELECTRIC SERVICE | | G | G | A | E | E |
| | MOVEMENT PREPARATION | | D | D | A | D | D |
| | LOADING AND UNLOADING OF PASSENGERS | | D | D | C | H | H |
| | OTA | | D | D | D | D | D |
| AUXILIARY-DEVICE SUPPLEMENTATION | HIGH-VOLTAGE TRANSFER | | G | G | (A) | (A) | (A) |
| | SOLAR LOW VOLTAGE | | (G) | (G) | (A) | (A) | (A) |

INFORMATION PROCESSING DEVICE, METHOD, NON-TRANSITORY STORAGE MEDIUM, AND VEHICLE

CROSS-REFERENCE TO RELATED APPLICATION

This application is a Continuation of U.S. patent application Ser. No. 17/405,156, filed on Aug. 18, 2021, which claims priority to Japanese Patent Application No. 2020-187358, filed on Nov. 10, 2020. Each of the prior applications is hereby incorporated by reference in entirety.

BACKGROUND

1. Technical Field

The present disclosure relates to an information processing device to be mounted on a vehicle, a method, a non-transitory storage medium, and a vehicle.

2. Description of Related Art

Japanese Unexamined Patent Application Publication No. 2020-037309 (JP 2020-037309 A) discloses a vehicle control system that can achieve a wide range of cooperative control through mutual communication between managers of different functional systems. Vehicle control is executed in a functional system including a manager that optimally controls operations of a plurality of outputters related to a vehicle function. The vehicle control is based on a request obtained by preadjusting a plurality of inputs for controlling a predetermined vehicle function.

SUMMARY

In the vehicle control system described in JP 2020-037309 A, each functional system determines whether the cooperative control can be executed based only on the request directly input to the functional system. Therefore, contradiction cannot be detected between the request input to each functional system and requests input to other functional systems. In the vehicle control system described in JP 2020-037309 A, the request to be transmitted from each functional system to other functional systems has already been adjusted. Therefore, the request cannot be changed even if the adjusted request is inconsistent with requests adjusted in other functional systems.

In the vehicle control system described in JP 2020-037309 A, when the request is a comprehensive request covering functions of a plurality of functional systems or a continuous request over time, there is a possibility that the request is not appropriately adjusted or adjustment is not established among functions of three or more functional systems.

The present disclosure provides an information processing device a method, a non-transitory storage medium, and a vehicle, configured to control a vehicle without causing inconsistency among operations of functions of a plurality of different functional systems.

An information processing device to be mounted on a vehicle according to a first aspect of a technology of the present disclosure includes a processor. The processor is configured to determine one mode out of a plurality of modes defining behavior of the vehicle that is related to usage and operation of the vehicle in response to a request for the vehicle. The processor is configured to make transition of a status of the vehicle among a plurality of statuses that is based on a state and a sub-mode. The state and the sub-mode are permitted in the determined mode. The processor is configured to control the vehicle based on the status of the vehicle that has been achieved by the transition.

In the information processing device according to the first aspect of the technology of the present disclosure, a condition for the processor to make the transition of the status of the vehicle may depend on the determined mode.

A method to be executed by a processor of an information processing device to be mounted on a vehicle according to a second aspect of the technology of the present disclosure includes determining one mode out of a plurality of modes defining behavior of the vehicle that is related to usage and operation of the vehicle in response to a request for the vehicle, making transition of a status of the vehicle among a plurality of statuses that is based on a state and a sub-mode, and controlling the vehicle based on the status of the vehicle that has been achieved by the transition. The state and the sub-mode are permitted in the determined mode.

A non-transitory storage medium according to a third aspect of the technology of the present disclosure stores instructions that are executable by one or more processors of an information processing device to be mounted on a vehicle and that cause the one or more processors to perform the following functions. The functions include determining one mode out of a plurality of modes defining behavior of the vehicle that is related to usage and operation of the vehicle in response to a request for the vehicle, making transition of a status of the vehicle among a plurality of statuses that is based on a state and a sub-mode, and controlling the vehicle based on the status of the vehicle that has been achieved by the transition. The state and the sub-mode are permitted in the determined mode.

The information processing device according to the first aspect of the technology of the present disclosure may be mounted on a vehicle.

According to the information processing device of the present disclosure, the control condition of the vehicle can centrally be managed through the state transition using the mode and state. Thus, the overall vehicle can appropriately be controlled without causing inconsistency among the operations of the functions of the different functional systems.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 13 illustrates Example 1 of status transition in which the main modes, the states, and the sub-modes are associated with each other;

FIG. 14 illustrates Example 2 of status transition in which the main modes, the states, and the sub-modes are associated with each other;

FIG. 19 illustrates Example 7 of status transition in which the main modes, the states, and the sub-modes are associated with each other;

FIG. 20 illustrates an example of adjustment requirements between the sub-modes in Example 7 of FIG. 19;

FIG. 21 illustrates Example 8 of status transition in which the main modes, the states, and the sub-modes are associated with each other;

DETAILED DESCRIPTION OF EMBODIMENTS

An information processing device of the present disclosure provides functions of a control platform by a vehicle integrated electronic control unit (ECU) (central ECU) alone, an external cloud alone, or a combination of the vehicle integrated ECU and the external cloud. The control platform operates as a central brain configured to control overall operation and behavior of a vehicle. The use of the control platform can achieve appropriate control on the overall vehicle without causing inconsistency among operations of functions of a plurality of different functional systems.

EMBODIMENT

Configuration

Figure 1:
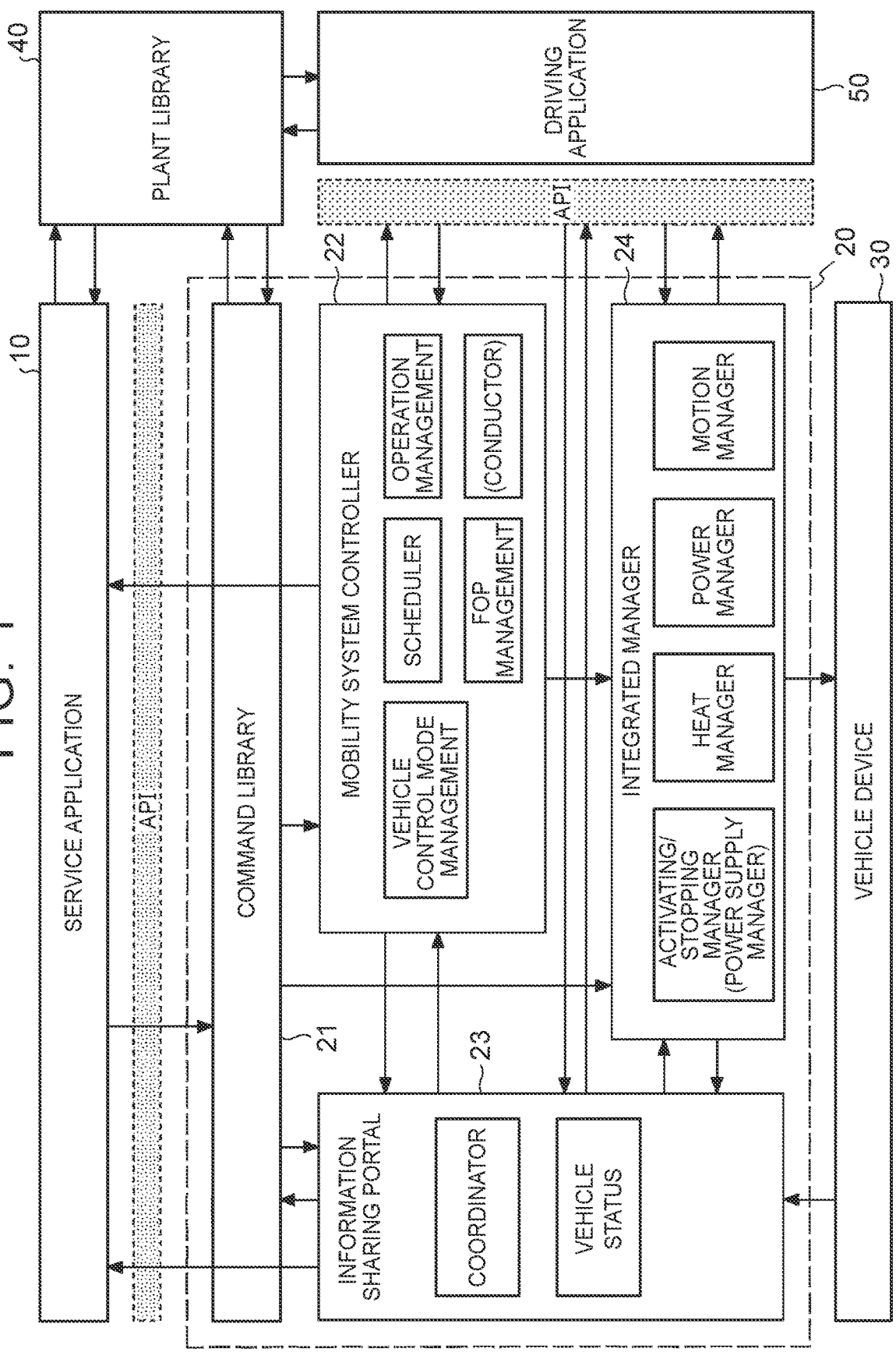
FIG. 1 is a functional block diagram of a vehicle control system including an information processing device according to one embodiment.

FIG. 1 is a functional block diagram of a vehicle control system including an information processing device 20 according to one embodiment of the present disclosure. The functional blocks exemplified in FIG. 1 include a service application 10, the information processing device 20, a vehicle device 30, a plant library 40, and a driving application 50. The information processing device 20 includes a command library 21, a mobility system controller 22, an information sharing portal 23, and an integrated manager 24. The vehicle control system may be mounted on a vehicle such as an automobile.

1. Service Application 10

The service application 10 is a functional block including applications that implement services. The services are implemented by using pieces of information in the inside and outside of the vehicle and components of the vehicle. Examples of the services include real-time operations of the vehicle as an automobile or product, scheduling related to activation of applications (self applications and other applications) based on set times, collection and processing of databases, recording into recording media, and wireless transmission to the outside. The application of this embodiment requests (calls) an abstract command predefined in the command library 21 from the information processing device 20 via an application programming interface (API). The abstract request may include supplementary information (for example, expected service execution period, priority, or frequency). For example, a service provider can provide any service by programming the application using an API depending on purposes. The contents of the API open to business entities or the like may be changed depending on levels of software developers. Thus, the developers of the business entities or the like can easily develop an application for implementing a new function. In the development, the developers of the business entities or the like need not be aware of an electronic platform in the vehicle, the structures of devices in the vehicle (actuators or sensors), and an energy (electric or heat) system of the vehicle. Various applications may be exemplified as the applications. For example, the applications are related to a cockpit user experience (UX), a remote service, Mobility-as-a-Service (MaaS), an energy management service, and an over-the-air (OTA) update service.

The service application 10 requests various services from the command library 21. The service application 10 refers to shared information open to the public at the information sharing portal 23. The service application 10 inputs a trigger for an instruction to activate an application from the mobility system controller 22 to the information sharing portal 23. The service application 10 can exchange information with the plant library 40. Each application in the service application 10 is basically executed in the vehicle, but may partially be executed in the cloud.

2. Command Library 21

The command library 21 is a functional block including an abstract API. This API implements control in response to an abstract service request (service API call) relating to the service from the service application 10. In other words, the command library 21 converts a request received from the service application 10 into a request for the integrated manager 24 or the mobility system controller 22. For example, the command library 21 includes a library of various commands for implementing the following functions in association.

(1) Function of implementing a single or complex operation command for the vehicle device 30 (such as an actuator). This operation command is a command for fulfilling a request received from the service application 10.

(2) Function of outputting (issuing) a switching trigger for a vehicle control mode. The vehicle control mode defines behavior of the vehicle (usage of the vehicle as a product).

(3) Function of activating and stopping a power supply. The power supply operates a system necessary to fulfill a request.

(4) Function of providing an instruction to adjust energy sources in response to an entered energy demand (demand merging, demand weighting, suppliability determination, and selection of sources).

(5) Function of registering shared information in the information sharing portal 23. The shared information is processed and/or generated by using various types of data.

(6) Function of storing necessary information in a storage and operating internal and external communication devices.

(7) Timer function for activating a specified application at a set time.

For example, the command library 21 outputs a trigger for an instruction to switch the vehicle control mode, transmits an operation schedule, and reports scheduling to the mobility system controller 22. The command library 21 outputs a control request or a service request to the integrated manager 24. The command library 21 receives various service requests from the service application 10. The command library 21 can provide the information sharing portal 23 with application modification information to be open to the public. The command library 21 refers to shared information open to the public at the information sharing portal 23. The command library 21 can exchange information with the plant library 40.

3. Mobility System Controller 22

The mobility system controller 22 is a functional block (determiner and status transitioner) configured to, for example, centrally manage a control condition related to behavior of the vehicle (usage or operation), manage progress of a series of tasks based on an operation schedule, and manage schedules. For example, the mobility system controller 22 has the following management functions.

(1) Vehicle Control Mode Management Function

The mobility system controller 22 manages overall control on the vehicle by using the following elements (plurality of modes and states). The mobility system controller 22 controls components of the vehicle device 30 and behavior of the system, and adjusts UX requests depending on situations of the vehicle (time, place, and occasion: TPO).

Main modes: determine the total usage of the vehicle depending on situations.
<automobile mode/electric mode/generator mode/stop mode>

States: manage transition of vehicle statuses along with sequential control phases.
<traveling state/motion state/transportation state/electric power infrastructure cooperation state>

Sub-modes: limit purposes and means of control under one or more modes.
<driving sub-mode/charging sub-mode/equipment power supply sub-mode/auxiliary-device supplementation sub-mode/AC power supply sub-mode>

(2) Schedule Management Function (Scheduler)

The mobility system controller 22 schedules a start time and an end time of a specified activity or application. Examples of the scheduling include timer charging and pre-air conditioning.

(3) Operation Management Function

In the use of MaaS, the mobility system controller 22 manages progress of vehicle movement, transportation service (flows of persons and goods), stay service, and associated tasks (such as a conductor function) based on operation schedule tables.

(4) Fail Operation (FOP) Management Function

The mobility system controller 22 centrally manages Fail-safe and FOP in a personally owned vehicle (PoV) and in MaaS. For example, this function includes generation of reliability information of a main subsystem and system diagnosis as necessary.

The mobility system controller 22 outputs an instruction to permit or prohibit control and indices necessary for adjustment to the integrated manager 24. The mobility system controller 22 outputs a trigger for an instruction to activate an application to the service application 10. For example, the mobility system controller 22 acquires a trigger for an instruction to switch the vehicle control mode, an operation schedule, and scheduling from the command library 21. The mobility system controller 22 can provide the information sharing portal 23 with mobility system information (such as a control mode, an operation condition, and a UX adjustment result) to be open to the public. The mobility system controller 22 refers to shared information open to the public at the information sharing portal 23. The mobility system controller 22 can further provide mobility system information (such as a driving mode and a destination) to the driving application 50, and refer to information in the driving application 50.

4. Information Sharing Portal 23

The information sharing portal 23 is a functional block configured to aggregate globally open information (shared information). The functional blocks such as the service application 10, the command library 21, the mobility system controller 22, and the integrated manager 24 refer to the shared information. Reference can be made to the shared information also from the external cloud or control domains connected by communication from the vehicle integrated ECU (central ECU). Examples of the shared information include information on a status of the vehicle, a surrounding condition of the vehicle, scenes inside and outside the vehicle, results of detection of user's needs, and input values from sensors. Each functional block can refer to the shared information of the information sharing portal 23 without recognizing the source of generation (provision) of the shared information. The information sharing portal 23 may include a coordinator that can process information on, for example, a traveling scene of the vehicle (time, weather, and temperature), a result of authentication of a vehicle user, and a storage capacity.

The information sharing portal 23 opens the shared information to the service application 10, the command library 21, the mobility system controller 22, the integrated manager 24, the vehicle device 30, and the driving application 50. The information sharing portal 23 can acquire application modification information openable to the public from the command library 21. The information sharing portal 23 can acquire mobility system information (such as a control mode, an operation condition, and a UX adjustment result) openable to the public from the mobility system controller 22. The information sharing portal 23 can acquire an adjustment result openable to the public from the integrated manager 24. The information sharing portal 23 can acquire general information (about sensors, communications, and analog signals) openable to the public from the vehicle device 30. The information sharing portal 23 may function as a gateway configured to output the general information acquired from the vehicle device 30 directly to the service application 10. The information sharing portal 23 can acquire a driving condition (such as a stop determination result) openable to the public from the driving application 50. The information open to the public at the information sharing portal 23 is basically registered (stored) in the vehicle. A part of the information may be registered (stored) in the cloud.

5. Integrated Manager 24

The integrated manager 24 is a functional block (controller) configured to execute adjustment related to, for example, limitation on a physical amount and whether to receive a request from the service application 10 (service API call) and determine a final command for the vehicle device 30 to fulfill the request based on a control condition of the mobility system controller 22 and various types of shared information that can be referred to at the information sharing portal 23. For example, the integrated manager 24 includes managers for managing the following functions. In this embodiment, the integrated manager 24 eliminates a difference caused by variations in equipment of the vehicle (hardware difference).

(1) System Activating/stopping Manager (power supply manager) Function

The integrated manager 24 controls activation and stop of a necessary system subordinate to the vehicle in response to a requested service need, and outputs a command (power ON/OFF, network management (NM) trigger, or communication request).

(2) Power Manager Function

The integrated manager 24 efficiently controls consumption and supply of electric power, including charging, discharging, and voltage conversion in the vehicle. In this embodiment, the integrated manager 24 executes adjustment toward fair supply responding to all energy demands (electric power or electric energy) entered (including scheduling) in the vehicle, determines whether to permit a service, determines upper and lower limits of an electric power balance, and selects an electric power source (such as a high-voltage battery or a charger).

(3) Heat Manager Function

The integrated manager 24 efficiently controls demand and supply of heat to be exhausted from the vehicle or used for heating. In this embodiment, the integrated manager 24 adjusts heat generation requests from the service application 10 (air conditioning or component temperature control), and outputs a command to start an engine or activate a fuel cell (FC) within a range in which fuel efficiency and emission requirements are satisfied.

(4) Motion Manager Function

The integrated manager 24 adjusts requests for a motion system configured to control functions related to motions of the vehicle, such as "run", "turn", and "stop". In this embodiment, the integrated manager 24 reflects requirements in the mobility system controller 22 (traveling state, motion state, and transportation operation management) and new requests in the MaaS service (such as prohibition of start and request for or prohibition of termination of vehicle holding).

An instruction to permit or prohibit control and indices necessary for adjustment are input to the integrated manager 24 from the mobility system controller 22. A control request (or a service request) is input to the integrated manager 24 from the command library 21. The integrated manager 24 may function as a gateway configured to output the control request input from the command library 21 directly to the vehicle device 30. The integrated manager 24 outputs adjusted commands (for actuators, communications, or driver outputs) to the vehicle device 30. The integrated manager 24 can provide the information sharing portal 23 with an adjustment result of each manager to be open to the public. The integrated manager 24 refers to, for adjustment, shared information open to the public at the information sharing portal 23. The integrated manager 24 can provide the driving application 50 with an answerback or an adjustment result of the motion manager. The integrated manager 24 can refer to information related to a vehicle motion (such as an acceleration and a steering angle) requested by the driving application 50.

In addition to the managers described above, the integrated manager 24 may include, for example, a human machine interface (HMI) manager configured to control functions related to electric equipment control (usability) for appropriately displaying information on a navigation screen and meters of the vehicle and appropriately providing operations on the vehicle.

6. Vehicle Device 30

The vehicle device 30 is a functional block including devices such as sensors and actuators where control information, operation requests, data, and signals are input and output finally. Examples of the vehicle device 30 include a sensor configured to acquire information indicating a surrounding condition of the vehicle and information indicating the status of the vehicle, and a sensor configured to acquire information on driver's driving operations for the vehicle (such as operations on an accelerator, a brake, a steering wheel, and a shift lever). Examples of the vehicle device 30 also include a device to be used for activating an air-conditioning system (IGP), a device to be used for activating a vehicle motion system (IGR), and an actuator of a starter (ST) configured to control activation of the engine.

Adjusted commands (for actuators, communications, or driver outputs) are input to the vehicle device 30 from the integrated manager 24. The vehicle device 30 can provide the information sharing portal 23 with general information (about sensors, communications, and analog signals) to be open to the public.

7. Plant Library 40

The plant library 40 is a functional block configured to provide environments such as artificial intelligence (AI) or machine learning algorithms, databases viewable from inside and outside of the vehicle, and a simulator configured to execute various simulations (such as estimation of a remaining charging period and map conversion) for use in improvement of controllability of the service application 10. The environments may partially or entirely be installed in the vehicle, or may be located in the cloud.

The plant library 40 can request necessary information from the service application 10, the command library 21, and the driving application 50 via a predetermined API. The plant library 40 can cause the service application 10, the command library 21, and the driving application 50 to acquire information indicating results of predetermined processes (such as simulations). The functions of the plant library 40 are basically installed in the vehicle, but may partially be executed in the cloud.

8. Driving Application 50

Among the applications installed in the vehicle, the driving application 50 is dedicated to driving of the vehicle and assistance of the driving, and is not included in the service application 10. Examples of the driving application 50 include remote driving such as autonomous parking, autonomous driving (AD), autonomous driving in MaaS (AutonoMaaS), and an advanced driver assistance system (ADAS).

The driving application 50 can refer to information (such as a driving mode and a destination) open to the public at the mobility system controller 22 via a predetermined vehicle driving API. The driving application 50 can cause the mobility system controller 22 to refer to information. The driving application 50 can provide a driving condition (such as a stop determination result) to the information sharing portal 23. The driving application 50 can acquire shared information (various types of data) open to the public at the information sharing portal 23. The driving application 50 can request a vehicle motion (such as an acceleration and a steering angle) toward the integrated manager 24. The driving application 50 can receive an answerback (such as an adjustment result) from the integrated manager 24. The driving application 50 can exchange information with the plant library 40. Each application in the driving application 50 is basically executed in the vehicle, but may partially be executed in the cloud.

Since the vehicle control system of this embodiment includes the functional blocks described above, the vehicle control system can implement various services by simply installing applications developed without being aware of, for example, the structure of the control platform, the defined commands, the system configuration of the vehicle, and the energy system handled in the vehicle.

Control

Referring to FIG. 2 to FIG. 12, detailed description is given of the vehicle control mode management that is one type of control to be executed by the mobility system controller 22 to implement various services in the vehicle control system of the present disclosure. The vehicle control mode management is control related to behavior of the vehicle (usage or operation).

In the vehicle control mode management, the mobility system controller 22 controls the behavior of the vehicle (usage or operation) by using the following control modes and control states.

(1) Main Modes (Vehicle Control Modes)
   1-1: Automobile mode
   1-2: Electric mode (stationary electric mode)
   1-3: Generator mode (emergency generator mode)
   1-4: Stop mode
(2) States
   2-1: Traveling state (standby, start, travel, end)
   2-2: Motion state (hold, stop, startability determination, drive, stopping necessity determination)
   2-3: Transportation state (standby, stop, depart, move)
   2-4: Electric power infrastructure cooperation state (standby, ready, charge, supply)
(3) Sub-Modes
   3-1: Driving sub-mode (manual, semi-automatic, full-automatic)
   3-2: Charging sub-mode (OFF, AC charging, direct current (DC) charging, contact, non-contact, solar high voltage)
   3-3: Equipment power supply sub-mode (OFF, electric service, movement preparation, loading and unloading of passengers, OTA)
   3-4: Auxiliary-device supplementation sub-mode (OFF, high-voltage transfer, solar low voltage)
   3-5: AC power supply sub-mode (OFF, indoor ACC, indoor V2L, outdoor V2G, outdoor V2L)

(1) Main Modes

In the main modes, the total usage of the vehicle is determined depending on situations. In the main modes, the automobile mode, the electric mode, the generator mode, or the stop mode is selected. The "automobile mode" fulfills a movement or transportation need to use the vehicle as an automobile that is an original function. In the automobile mode, functions related to motions of the vehicle, such as "run", "turn", and "stop", and their peripheral functions are executed. The "electric mode (or stationary electric mode)" fulfills a need to use the parked vehicle not as the automobile but as electric equipment (electric appliance) having a storage battery. In the electric mode, the storage battery is charged through high-voltage transfer or charger operation based on a power demand-supply balance in cooperation with the power manager of the integrated manager 24 as well as use of on-board devices. The "generator mode (or emergency generator mode)" fulfills a need to use the parked vehicle not as the automobile but as an emergency or daily-use generator. In the generator mode, necessary electric power is generated for use outside the vehicle. The "stop mode" is a default mode when the vehicle is not operating as the automobile, the electric appliance, or the generator.

Figure 2:
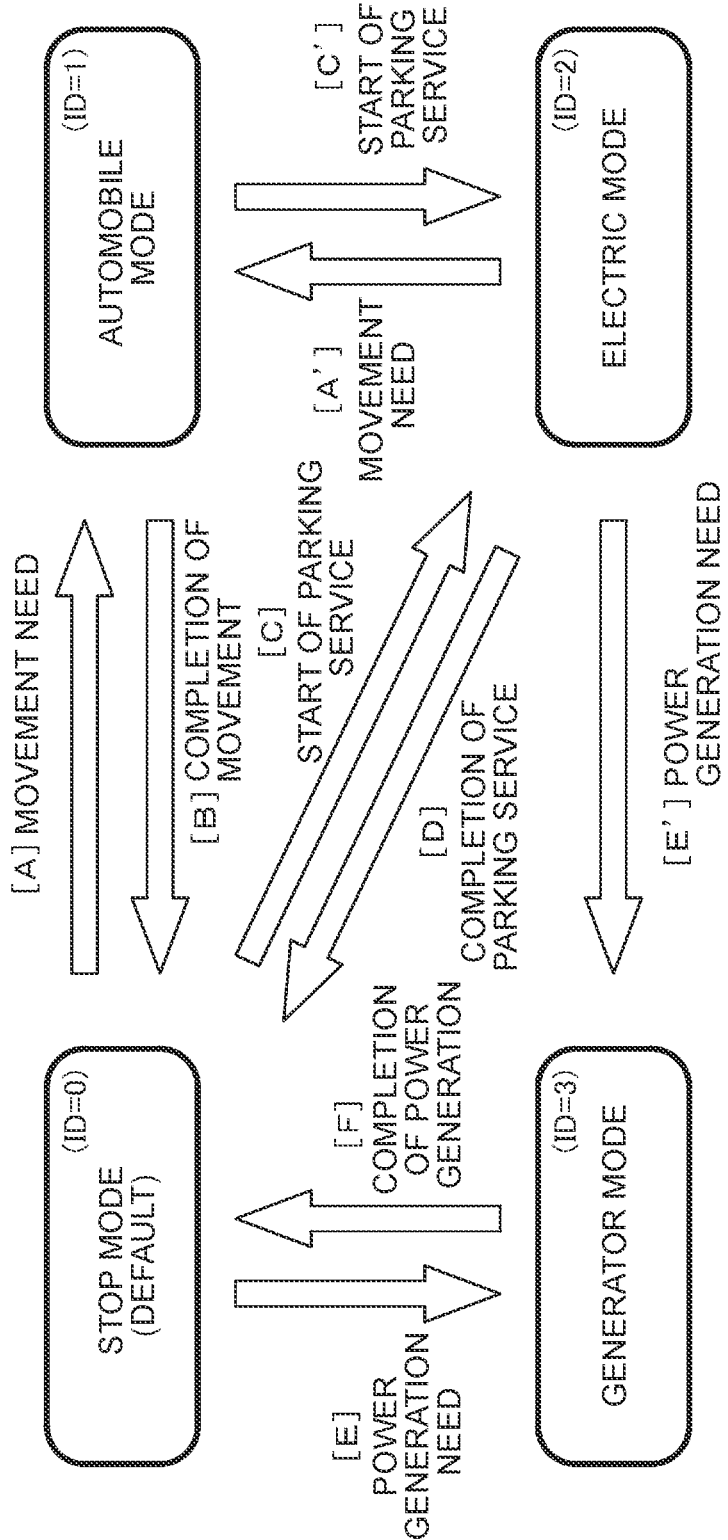
FIG. 2 is a status transition diagram in main modes.

FIG. 2 is a status transition diagram among the stop mode ((ID=0) in FIG. 2), the automobile mode ((ID=1) in FIG. 2), the electric mode ((ID=2) in FIG. 2), and the generator mode ((ID=3) in FIG. 2) of the main modes. The modes are switched based on the following conditions.

Stop Mode to Automobile Mode

When a movement need ([A] in FIG. 2) arises in the stop mode, the stop mode is switched to the automobile mode. For example, whether the movement need ([A] in FIG. 2) arises can be determined in response to a direct or indirect operation of the driver of the vehicle, detection of a request from MaaS (API), or termination of a vehicle holding status (shift position other than a parking (P) position).

Stop Mode to Electric Mode

When a parking service need ([C] in FIG. 2) arises in the stop mode, the stop mode is switched to the electric mode. For example, whether the parking service need ([C] in FIG. 2) arises can be determined based on a charging/discharging status of the storage battery or in response to detection of various services such as external power supply. The stop mode is switched to the electric mode in conformity with statuses of the electric power infrastructure cooperation state, the charging sub-mode, the equipment power supply sub-mode, and the auxiliary-device supplementation sub-mode described later.

Stop Mode to Generator Mode

When a power generation need ([E] in FIG. 2) arises in the stop mode, the stop mode is switched to the generator mode. For example, whether the power generation need ([E] in FIG. 2) arises can be determined in response to detection of a request for emergency power generation inside or outside the vehicle. The stop mode is switched to the generator mode in conformity with a status of the AC power supply sub-mode described later.

Automobile Mode to Stop Mode

When determination is made that movement is completed ([B] in FIG. 2) in the automobile mode, the automobile mode is switched to the stop mode. For example, whether the movement is completed ([B] in FIG. 2) can be determined when the movement need ([A] in FIG. 2) is ended and parking of the vehicle is completed.

Automobile Mode to Electric Mode

When a parking service need ([C'] in FIG. 2) arises in the automobile mode, the automobile mode is switched to the electric mode. The parking service need ([C'] in FIG. 2) is similar to the parking service need ([C] in FIG. 2). The automobile mode is switched to the electric mode in conformity with the statuses of the electric power infrastructure cooperation state, the charging sub-mode, the equipment power supply sub-mode, and the auxiliary-device supplementation sub-mode described later.

Electric Mode to Automobile Mode

When a movement need ([A'] in FIG. 2) arises in the electric mode, the electric mode is switched to the automobile mode. The movement need ([A'] in FIG. 2) is similar to the movement need ([A] in FIG. 2).

Electric Mode to Stop Mode

When determination is made that a parking service is completed ([D] in FIG. 2) in the electric mode, the electric mode is switched to the stop mode. For example, whether the parking service is completed ([D] in FIG. 2) can be determined when the parking service need ([C] in FIG. 2) is totally ended.

Electric Mode to Generator Mode

When a power generation need ([E'] in FIG. 2) arises in the electric mode, the electric mode is switched to the generator mode. The power generation need ([E'] in FIG. 2) is similar to the power generation need ([E] in FIG. 2). The electric mode is switched to the generator mode in conformity with the status of the AC power supply sub-mode described later.

Generator Mode to Stop Mode

When determination is made that power generation is completed ([F] in FIG. 2) in the generator mode, the generator mode is switched to the stop mode. For example, whether the power generation is completed ([F] in FIG. 2) can be determined when the power generation need ([E] in FIG. 2) is totally ended.

(2) States

Each state is under a specific mode among the main modes, and the vehicle statuses transition along with sequential control phases. The states include the traveling state, the motion state, and the transportation state to be selected in the automobile mode, and the electric power infrastructure cooperation state to be selected in the electric mode. In each state, the vehicle statuses transition along with the control phases as follows.

2-1: Traveling State

In the traveling state, statuses transition under the automobile mode. Possible vehicle statuses in the traveling state include "standby", "start", "travel", and "end". "Standby" is an initial status of the vehicle control system. In "standby", preparation for traveling (trip) of the vehicle is started when an instruction is given for a predetermined event, and transition is made to a sleeping status when no instruction is given. "Start" is a status in which the vehicle starts a power train system to start movement. In "start", a starting request (cranking request) is issued. "Travel" is a status in which the starting of the power train system is completed and a driving force can be generated. "End" is a status in which the driving force cannot be generated irrespective of traveling or stopping of the vehicle.

Figure 3:
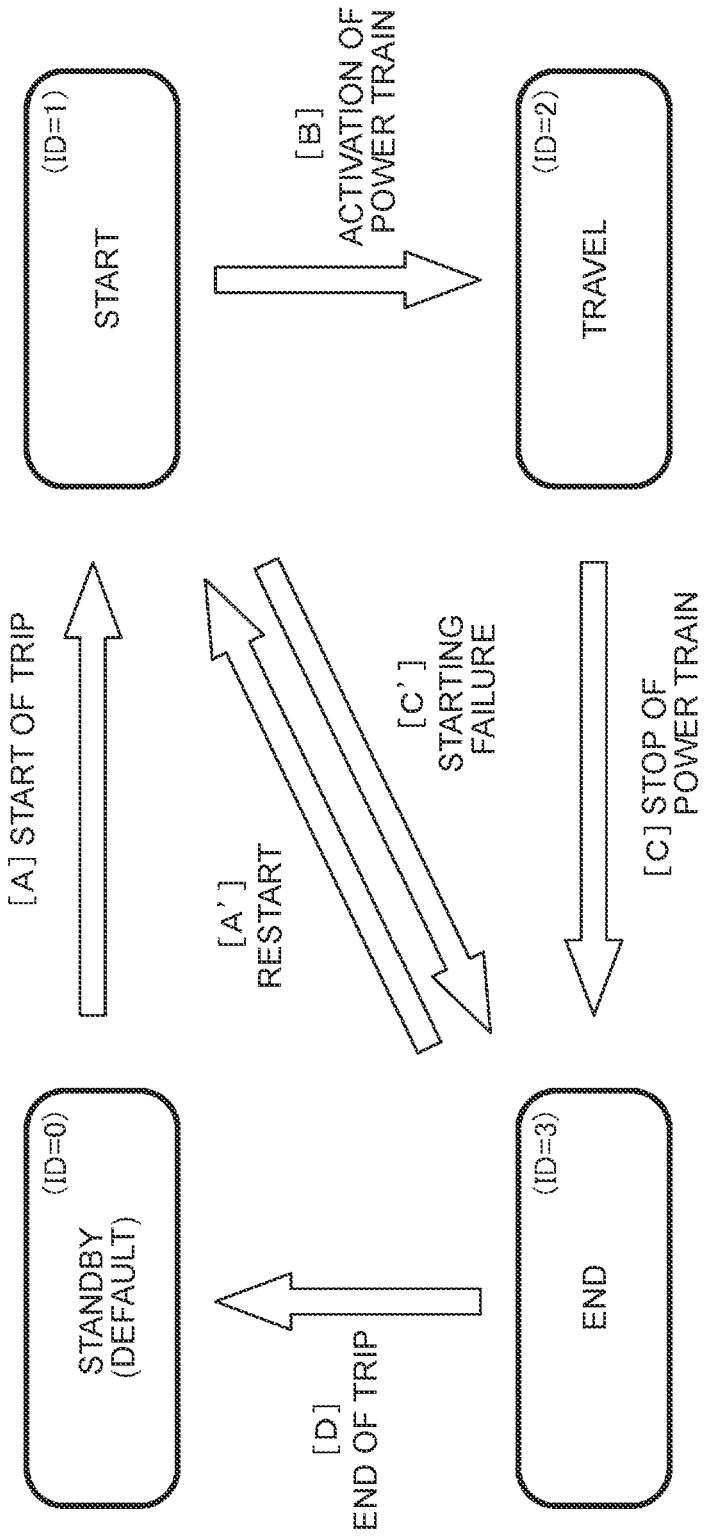
FIG. 3 is a status transition diagram in a traveling state.

FIG. 3 is a state transition diagram among "standby" ((ID=0) in FIG. 3), "start" ((ID=1) in FIG. 3), "travel" ((ID=2) in FIG. 3), and "end" ((ID=3) in FIG. 3) of the traveling state. The statuses transition based on the following conditions.

Standby to Start

When determination is made that a trip is started ([A] in FIG. 3) in "standby", "standby" transitions to "start". For example, whether the trip is started ([A] in FIG. 3) can be determined in response to a direct or indirect operation of the driver of the vehicle or detection of a request from MaaS (API).

Start to Travel

When determination is made that the power train is activated ([B] in FIG. 3) in "start", "start" transitions to "travel". In a case where the vehicle is a hybrid electric vehicle (HEV), an electric vehicle (EV), or a plug-in hybrid electric vehicle (PHEV), whether the power train is activated ([B] in FIG. 3) can be determined when an operation status is "Ready-ON". In a case where the vehicle is an automobile including an internal combustion engine (conventional vehicle), whether the power train is activated ([B] in FIG. 3) can be determined when the engine is combusted completely.

Travel to End

When determination is made that the power train is stopped ([C] in FIG. 3) in "travel", "travel" transitions to "end". Whether the power train is stopped ([C] in FIG. 3) can be determined when the request from the driver of the vehicle or MaaS (API) is withdrawn or the operation status of the vehicle is "Ready-OFF".

End to Standby

When determination is made that the trip is ended ([D] in FIG. 3) in "end", "end" transitions to "standby". Whether the trip is ended ([D] in FIG. 3) can be determined when the vehicle is stopped and held (the shift position is the parking (P) position).

End to Start

When determination is made that the power train is restarted ([A'] in FIG. 3) in "end", "end" transitions to "start". For example, whether the power train is restarted ([A'] in FIG. 3) can be determined in response to a direct or indirect operation performed again by the driver of the vehicle or re-detection of a request from MaaS (API).

Start to End

When determination is made that the starting of the power train has failed ([C'] in FIG. 3) in "start", "start" transitions to "end". For example, whether the starting of the power train has failed ([C'] in FIG. 3) can be determined when the activation of the power train ([B] in FIG. 3) cannot be detected after an elapse of a predetermined period.

2-2: Motion State

In the motion state, statuses transition under the automobile mode. Possible vehicle statuses in the motion state include "hold", "stop", "startability determination", "drive", and "stopping necessity determination". "Hold" is an initial status of the vehicle control system. In "hold", a service or activity is permitted on the premise that the vehicle does not move. In this period, termination of the vehicle holding state is prohibited as necessary. "Stop" is a status in which the vehicle cannot be started mainly due to an external factor other than a road condition. In "stop", the vehicle is stopped by holding the brake. "Startability determination" is a status in which a person having responsibility for driving (such as the driver) intends to temporarily stop the vehicle by holding the brake based on, for example, the road condition. "Drive" is a status in which the person having responsibility for driving (such as the driver) intends to execute a vehicle motion (such as traveling) while a driving force is generated as appropriate. "Stopping necessity determination" is a status in which the vehicle needs to be stopped mainly due to an external factor other than the road condition and the power train system cannot be permitted to generate the driving force.

Figure 4:
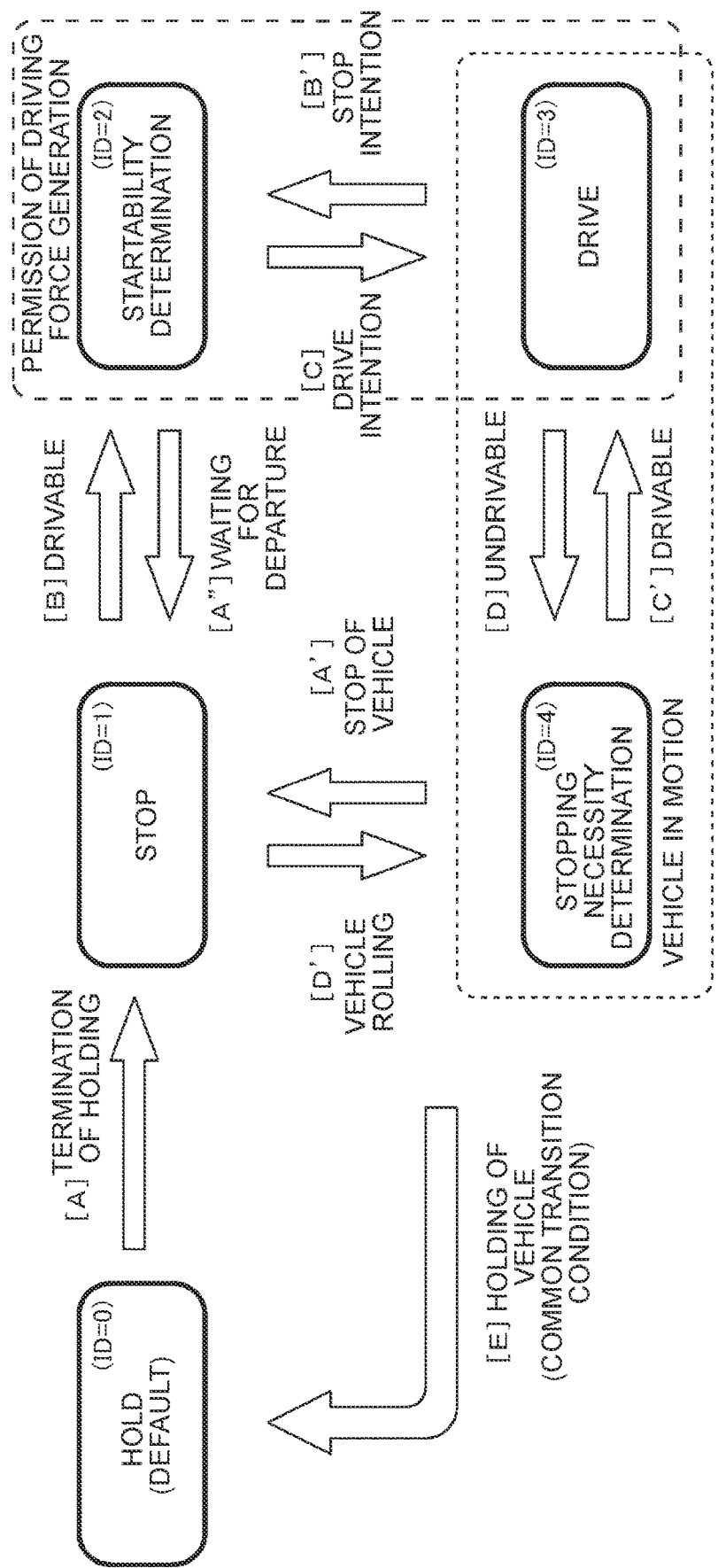
FIG. 4 is a status transition diagram in a motion state.

FIG. 4 is a status transition diagram among "hold" ((ID=0) in FIG. 4), "stop" ((ID=1) in FIG. 4), "startability determination" ((ID=2) in FIG. 4), "drive" ((ID=3) in FIG. 4), and "stopping necessity determination" ((ID=4) in FIG. 4) of the motion state. "Startability determination" is a status to be selected while generation of the driving force is permitted. "Stopping necessity determination" is a status to be selected while the vehicle motion is executed. "Drive" is a status to be selected while permitting generation of the driving force and executing the vehicle motion. The statuses transition based on the following conditions.

Hold to Stop

When determination is made that holding is terminated ([A] in FIG. 4) in "hold", "hold" transitions to "stop". For example, whether the holding is terminated ([A] in FIG. 4) can be determined when the shift position is a position other than the parking (P) position (a parking lock is released) and a parking brake is released.

Stop to Startability Determination

When determination is made that drive is possible ([B] in FIG. 4) in "stop", "stop" transitions to "startability determination". For example, whether the drive is possible ([B] in FIG. 4) can be determined when the operation status of the vehicle is "Ready-ON" and the vehicle motion system has reliability.

Startability Determination to Drive

When determination is made that drive intention arises ([C] in FIG. 4) in "startability determination", "startability determination" transitions to "drive". For example, whether the drive intention arises ([C] in FIG. 4) can be determined when the shift position is a position of a drive (D) or reverse (R) position and the brake is turned OFF (a brake pedal is not depressed).

Drive to Stopping Necessity Determination

When determination is made that the drive is impossible ([D] in FIG. 4) in "drive", "drive" transitions to "stopping necessity determination". For example, whether the drive is impossible ([D] in FIG. 4) can be determined when the operation status of the vehicle is "Ready-OFF", the vehicle motion system has no reliability (system malfunction), or determination is made to immediate stop the vehicle by the conductor function. The conductor function can limit (lock) the operation of the movable vehicle.

Stopping Necessity Determination to Stop

When determination is made that the vehicle is stopped ([A'] in FIG. 4) in "stopping necessity determination", "stopping necessity determination" transitions to "stop". For example, whether the vehicle is stopped ([A'] in FIG. 4) can be determined when the speed of the vehicle (vehicle speed) is zero or substantially zero corresponding to stop.

Startability Determination to Stop

When determination is made that the vehicle is waiting for departure ([A"] in FIG. 4) in "startability determination", "startability determination" transitions to "stop". For example, whether the vehicle is waiting for departure ([A"] in FIG. 4) can be determined when preparation for departure is not completed by the conductor function or error proofing is activated in response to an erroneous operation.

Drive to Startability Determination

When determination is made that stop intention arises ([B'] in FIG. 4) in "drive", "drive" transitions to "startability determination". For example, whether the stop intention arises ([B'] in FIG. 4) can be determined when the brake is turned ON (the brake pedal is depressed) and the vehicle speed is zero or substantially zero corresponding to stop.

Stopping Necessity Determination to Drive

When determination is made that drive is possible ([C'] in FIG. 4) in "stopping necessity determination", "stopping necessity determination" transitions to "drive". Similarly to the determination as to whether the drive is possible ([B] in FIG. 4), whether the drive is possible ([C'] in FIG. 4) can be determined, for example, when the operation status of the vehicle is "Ready-ON" and the vehicle motion system has reliability.

Stop to Stopping Necessity Determination

When determination is made that the vehicle rolls ([D'] in FIG. 4) in "stop", "stop" transitions to "stopping necessity determination". For example, whether the vehicle rolls ([D'] in FIG. 4) can be determined when the stopped vehicle starts to move forward or rearward.

Stop, Startability Determination, Drive, or Stopping Necessity Determination to Hold When determination is made that the vehicle is held ([E] in FIG. 4) in "stop", "startability determination", "drive", or "stopping necessity determination", the status transitions to "hold". For example, whether the vehicle is held ([E] in FIG. 4) can be determined when the shift position is the parking (P) position or the parking brake is actuated.

2-3: Transportation State

In the transportation state, statuses transition under the automobile mode. Possible vehicle statuses in the transportation state include "standby", "stop", "depart", and "move". "Standby" is an initial status of the vehicle control system. "Standby" is selected when the vehicle is used as a personally owned vehicle (PoV) having no mobility need. "Stop" is a status in which the vehicle is parked at a destination to load or unload passengers or baggage and execute a task associated with the parking. "Depart" is a status in which preparation and check are executed immediately before departure for a next destination. "Depart" is continued until the preparation and check are completed. "Move" is a status in which a sequence of tasks is executed depending on purposes or progress of a transportation schedule (reference to other information).

Figure 5:
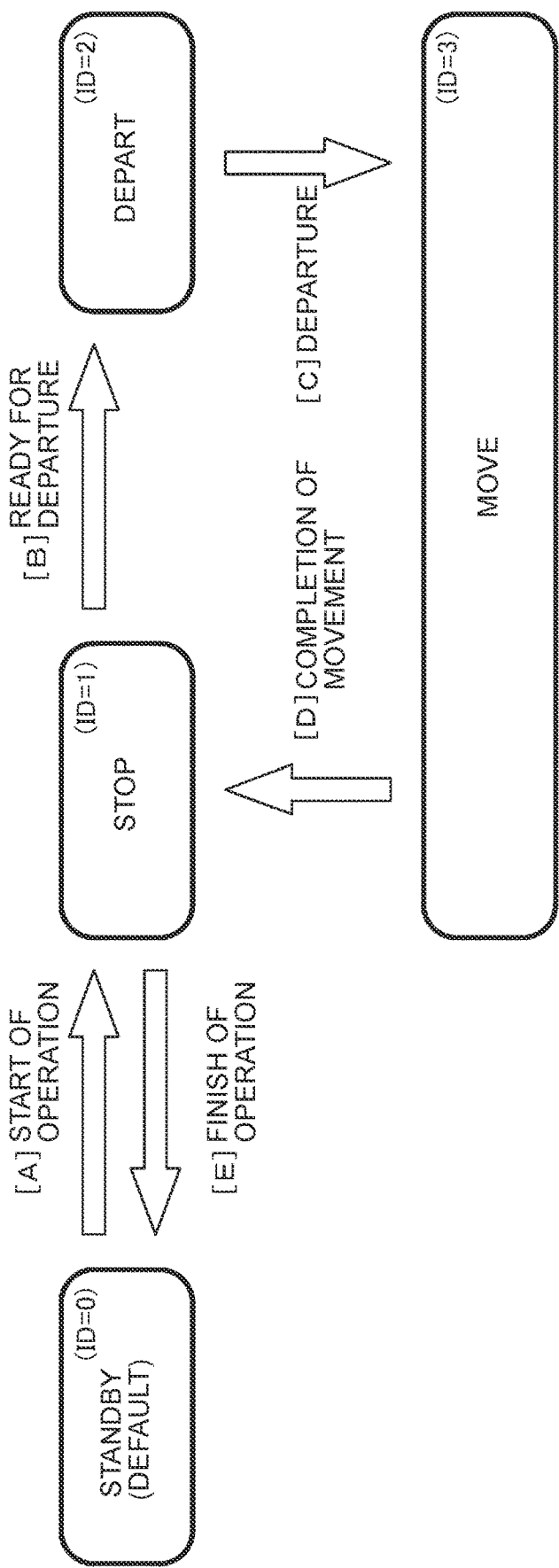
FIG. 5 is a status transition diagram in a transportation state.

FIG. 5 is a status transition diagram among "standby" ((ID=0) in FIG. 5), "stop" ((ID=1) in FIG. 5), "depart" ((ID=2) in FIG. 5), and "move" ((ID=3) in FIG. 5) of the transportation state. The statuses transition based on the following conditions.

Standby to Stop

When determination is made that an operation is started ([A] in FIG. 5) in "standby", "standby" transitions to "stop". For example, whether the operation is started ([A] in FIG. 5) can be determined when the start of a movement service is accepted. Examples of a task associated with the stop mainly include switching of the condition of transition to a different state.

Stop to Depart

When determination is made that the vehicle is ready for departure ([B] in FIG. 5) in "stop", "stop" transitions to "depart". For example, whether the vehicle is ready for departure ([B] in FIG. 5) can be determined in response to detection of information indicating that a scheduled departure time has come. Examples of a task associated with the departure mainly include closing of an automatic door in a human flow service, and prohibition of termination of vehicle holding during the closing operation.

Depart to Move

When determination is made that the vehicle has departed ([C] in FIG. 5) in "depart", "depart" transitions to "move". For example, whether the vehicle has departed ([C] in FIG. 5) can be determined in response to transition from the traveling state to the "drive" status. Examples of a task associated with the departure mainly include various announcements related to a human flow.

Move to Stop

When determination is made that the movement is completed ([D] in FIG. 5) in "move", "move" transitions to "stop". For example, whether the movement is completed ([D] in FIG. 5) can be determined in response to detection of information indicating that the vehicle arrives at a destination. Examples of a task associated with the stop mainly include issuance of a vehicle holding command, and opening of the automatic door in the human flow service.

Stop to Standby

When determination is made that the operation is finished ([E] in FIG. 5) in "stop", "stop" transitions to "standby". For example, whether the operation is finished ([E] in FIG. 5) can be determined when the movement service is completed or a halt of the movement service is accepted. Examples of a task associated with the standby mainly include resetting of the transition condition.

2-4: Electric Power Infrastructure Cooperation State

In the electric power infrastructure cooperation state, statuses transition under the electric mode. Possible vehicle statuses in the electric power infrastructure cooperation state include "standby", "ready", "charge", and "supply". "Standby" is an initial status with no infrastructure cooperation request. "Ready" is a status in which an infrastructure cooperation request is recognized and then the vehicle is waiting for selection of a charging or discharging (power supply) step, or a status in which the charging and discharging steps are being switched. "Charge" is a status indicating the charging step for charging from infrastructure to the vehicle (or its storage battery). "Supply" is a status indicating the supplying step for supplying energy from the vehicle (or its storage battery) to the infrastructure.

Figure 6:
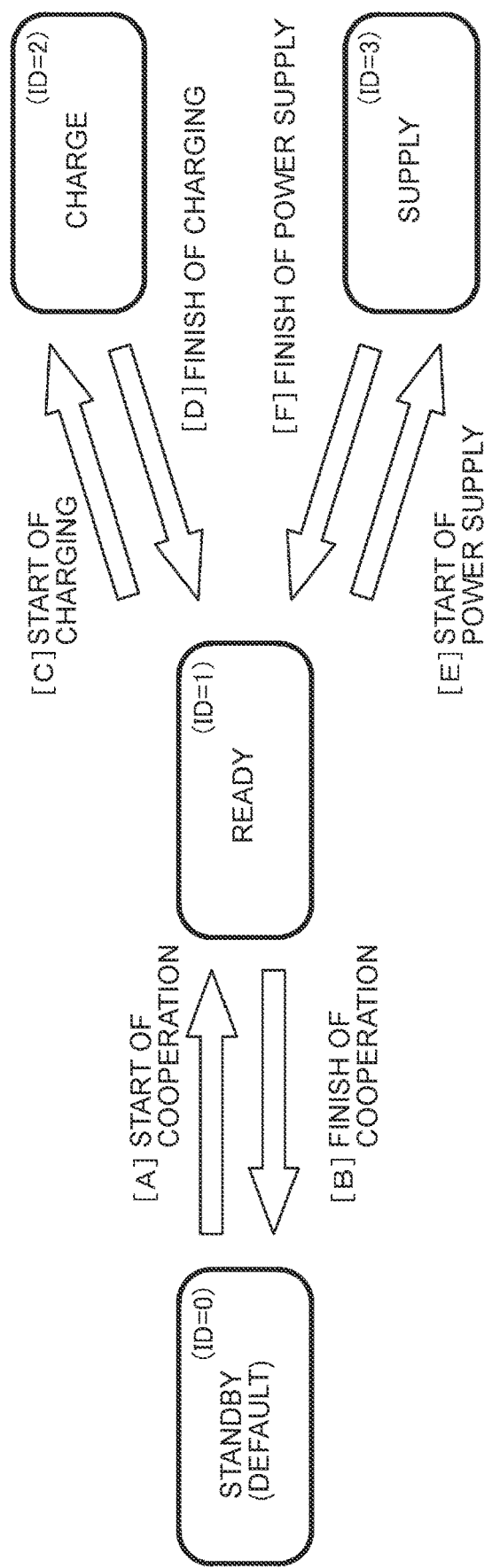
FIG. 6 is a status transition diagram in an electric power infrastructure cooperation state.

FIG. 6 is a status transition diagram among "standby" ((ID=0) in FIG. 6), "ready" ((ID=1) in FIG. 6), "charge" ((ID=2) in FIG. 6), and "supply" ((ID=3) in FIG. 6) of the electric power infrastructure cooperation state. The statuses transition based on the following conditions.

Standby to Ready

When determination is made that cooperation is started ([A] in FIG. 6) in "standby", "standby" transitions to "ready". For example, whether the cooperation is started ([A] in FIG. 6) can be determined in response to detection of an infrastructure cooperation request.

Ready to Standby

When determination is made that the cooperation is finished ([B] in FIG. 6) in "ready", "ready" transitions to "standby". For example, whether the cooperation is finished ([B] in FIG. 6) can be determined when the infrastructure cooperation request is not detected.

Ready to Charge

When determination is made that charging is started ([C] in FIG. 6) in "ready", "ready" transitions to "charge". For example, whether the charging is started ([C] in FIG. 6) can be determined in response to a charging instruction from infrastructure to the vehicle.

Charge to Ready

When determination is made that the charging is finished ([D] in FIG. 6) in "charge", "charge" transitions to "ready". For example, whether the charging is finished ([D] in FIG. 6) can be determined in response to a charging finish instruction or a power supply start instruction from the infrastructure to the vehicle. The charging step is switched to the power supply step such that "charge" temporarily returns to "ready" and then "ready" transitions to "supply".

Ready to Supply

When determination is made that power supply is started ([E] in FIG. 6) in "ready", "ready" transitions to "supply". For example, whether the power supply is started ([E] in FIG. 6) can be determined in response to a power supply instruction from the infrastructure to the vehicle.

Supply to Ready

When determination is made that the power supply is finished ([F] in FIG. 6) in "supply", "supply" transitions to "ready". For example, whether the power supply is finished ([F] in FIG. 6) can be determined in response to a power supply finish instruction or a charging start instruction from the infrastructure to the vehicle. The power supply step is switched to the charging step such that "supply" temporarily returns to "ready" and then "ready" transitions to "charge".

Figure 7:
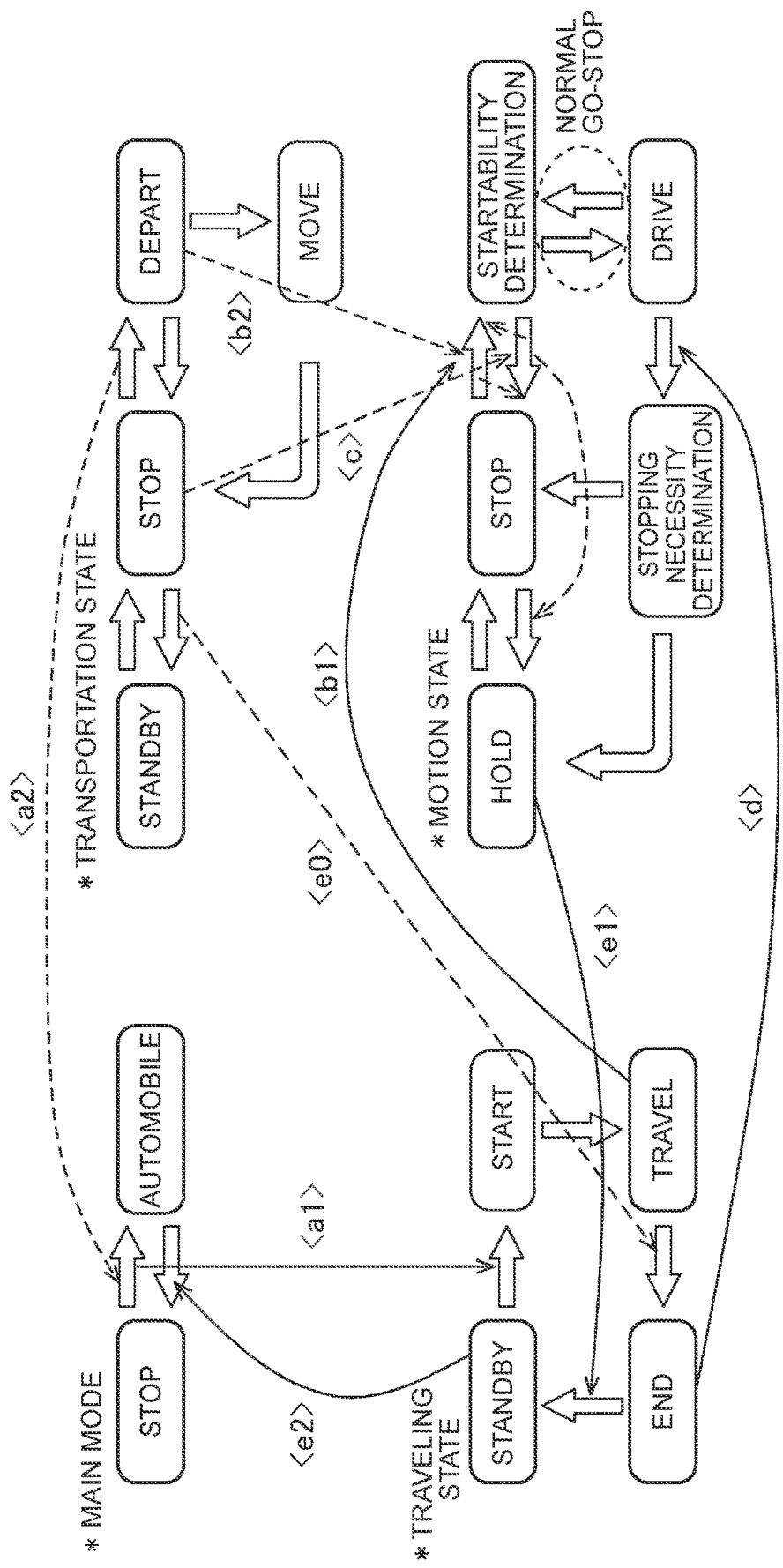
FIG. 7 illustrates an example of a correlation of transition among the states in an automobile mode.

FIG. 7 illustrates an example of a correlation of transition among the states (traveling, motion, and transportation states) in the automobile mode. As illustrated in FIG. 7, in the vehicle control mode management of this embodiment, transition to a different status is prohibited depending on a combination of the main mode and one or more statuses of each of the individual states, thereby avoiding interference of various requests and avoiding control stagnation or the like through forcible transition to a different status.

<a1> in FIG. 7: When a trip start request is made and the main mode is switched from "stop" to "automobile", the traveling state transitions from "standby" to "start".

<a2> in FIG. 7: In a movement service of MaaS, a higher-level movement service request is associated.

<b1> in FIG. 7: When the traveling state transitions to "travel" after becoming "Ready-ON", the motion state transitions to "startability determination".

<b2> in FIG. 7: In the movement service of MaaS, "stop" of the motion state is kept until preparation for departure is completed (the transportation state transitions to "depart").

<c> in FIG. 7: When a stop request is made in the movement service of MaaS, transition to "startability determination" is prohibited in the motion state.

<d> in FIG. 7: When determination is made that the vehicle becomes "Ready-OFF" during traveling, the motion state transitions to "stopping necessity determination" and the vehicle is stopped without generating a driving force.

<e1> in FIG. 7: When the traveling of the vehicle is ended, the motion state transitions to "hold" to finish the trip.

<e2> in FIG. 7: The main mode is switched from "automobile" to "stop" and the use of the vehicle is ended.

<e0> in FIG. 7: In the movement service of MaaS, the traveling state transitions from "end" to "standby" in response to transition of the transportation state from "stop" to "standby".

(3) Sub-Modes

In the sub-modes, purposes and means of control are limited under one or more main modes. The sub-modes include the driving sub-mode, the charging sub-mode, the equipment power supply sub-mode, the auxiliary-device supplementation sub-mode, and the AC power supply sub-mode. In each sub-mode, the vehicle statuses transition depending on the purposes and means of control as follows.

3-1: Driving Sub-Mode

In the driving sub-mode, individual statuses transition under the automobile mode. Possible vehicle statuses in the driving sub-mode include "manual", "semi-automatic", and "full-automatic". "Manual" is an initial status of the vehicle control system, and is a driving status in which the driver has responsibility (manual and attended). In "manual", driving assistance functions such as adaptive cruise control (ACC) and lane tracing assist (LTA) are executed. "Semi-automatic" is a driving status in which an autonomous driving system has responsibility but the driving responsibility is transferred to the driver in the event of emergency (autonomous and attended). "Semi-automatic" is expected to be at or below Level 4 of autonomous driving that is defined by the Society of Automotive Engineers (SAE). "Full-automatic" is a driving status in which the autonomous driving system has responsibility and driving can be performed even if the driver is absent (autonomous and unattended). "Full-automatic" is expected to be at or above Level 5 of autonomous driving that is defined by the Society of Automotive Engineers (SAE). In "full-automatic", a remote parking function can be executed.

Figure 8:
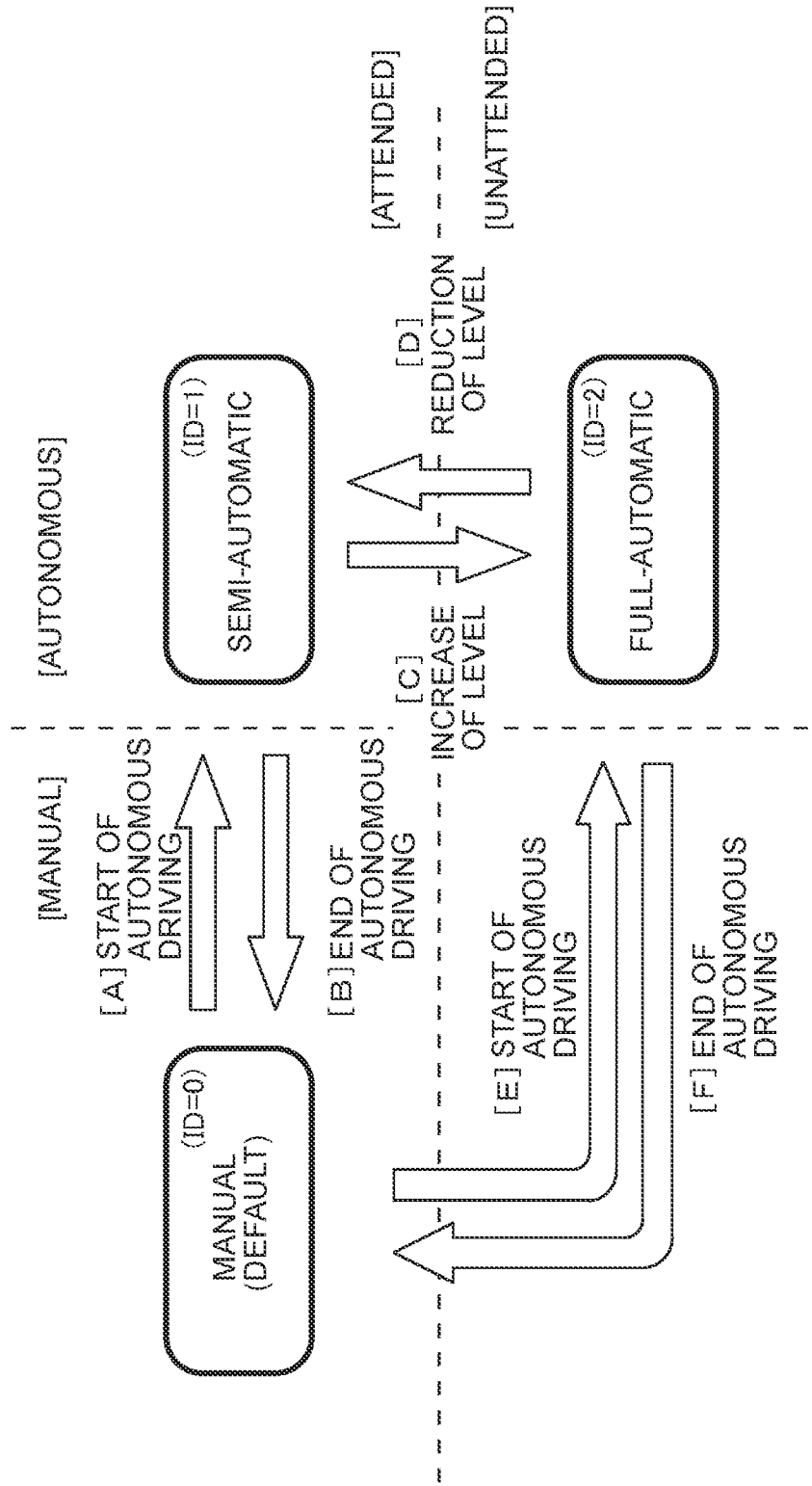
FIG. 8 is a status transition diagram in a driving sub-mode.

FIG. 8 is a status transition diagram among "manual" ((ID=0) in FIG. 8), "semi-automatic" ((ID=1) in FIG. 8), and "full-automatic" ((ID=2) in FIG. 8) of the driving sub-mode. The individual statuses transition based on the following conditions.

Manual to Semi-Automatic

When determination is made that autonomous driving is started ([A] in FIG. 8) in "manual", "manual" transitions to "semi-automatic". For example, whether the autonomous driving is started ([A] in FIG. 8) can be determined in response to a request for autonomous driving (Level 1 to Level 4) from the driver of the vehicle.

Semi-Automatic to Manual

When determination is made that the autonomous driving is ended ([B] in FIG. 8) in "semi-automatic", "semi-automatic" transitions to "manual". For example, whether the autonomous driving is ended ([B] in FIG. 8) can be determined when the request for autonomous driving (Level 1 to Level 4) from the driver of the vehicle is withdrawn, the vehicle moves out of an autonomous driving area (a trip is ended), or the responsibility is transferred from the autonomous driving system having malfunction to the driver (handover is completed).

Semi-Automatic to Full-Automatic

When determination is made that the level is increased ([C] in FIG. 8) in "semi-automatic", "semi-automatic" transitions to "full-automatic". For example, whether the level is increased ([C] in FIG. 8) can be determined in response to a request for autonomous driving (at or above Level 5) from the driver of the vehicle or the movement service of MaaS, acceptance of remote parking (loading/unloading), or detection of a driver's faint (dead man's determination).

Full-Automatic to Semi-Automatic

When determination is made that the level is reduced ([D] in FIG. 8) in "full-automatic", "full-automatic" transitions to "semi-automatic". For example, whether the level is reduced ([D] in FIG. 8) can be determined in response to recognition of the driver of the vehicle and a request for autonomous driving (Level 1 to Level 4).

Manual to Full-Automatic

When determination is made that autonomous driving is started ([E] in FIG. 8) in "manual", "manual" transitions to "full-automatic". For example, whether the autonomous driving is started ([E] in FIG. 8) can be determined in response to a request for autonomous driving (at or above Level 5) from the driver of the vehicle or the movement service of MaaS or acceptance of remote parking (loading/unloading).

Full-Automatic to Manual

When determination is made that the autonomous driving is ended ([F] in FIG. 8) in "full-automatic", "full-automatic" transitions to "manual". For example, whether the autonomous driving is ended ([F] in FIG. 8) can be determined when the request for autonomous driving (at or above Level 5) from the driver of the vehicle is withdrawn, the vehicle moves out of an autonomous driving area (a trip is ended), or unloading of the vehicle is completed by valet parking.

3-2: Charging Sub-Mode

In the charging sub-mode, individual statuses transition under the electric mode. Possible vehicle statuses in the charging sub-mode include "OFF", "AC charging", "DC charging", "non-contact", "contact", and "solar high voltage". "OFF" is a default status when the vehicle is not charged. "AC charging", "DC charging", "non-contact", "contact", and "solar high voltage" are the following vehicle charging statuses.

"AC charging" is a status in which charging of the storage battery of the vehicle using an AC power supply is selected. For example, "AC charging" is selected when charging the vehicle by the user inserting a plug into an AC power supply facility (including a start of charging through activation of a timer), receiving AC power in the process of infrastructure cooperation of the vehicle (V2G), or directly supplying electric power to vehicle equipment by using an AC charger during a parking service (for example, pre-air conditioning or use of private room). For example, transition to "AC charging" is triggered by a plug connecting operation, a pre-air conditioning request, or a private room request input from the user, or arrival of a timer set time or V2x/VPP requested by the system.

"DC charging" is a status in which charging of the storage battery of the vehicle using a DC power supply or discharging from the storage battery is selected. For example, "DC charging" is selected when charging the vehicle by the user inserting a plug into a DC power supply facility, receiving or supplying DC power in the process of infrastructure cooperation of the vehicle (V2G), or supplying electric power in parallel to a parking service. For example, transition to "DC charging" is triggered by a plug connecting operation, a pre-air conditioning request, or a private room request input from the user, or arrival of a timer set time or V2x/VPP determined by the system.

"Non-contact" is a status in which charging of the storage battery of the vehicle out of contact with a charging facility is selected. For example, "non-contact" is selected when the vehicle placed at a charging station is manually charged by the user through a switching (SW) operation. For example, transition to "non-contact" is triggered by the SW operation input from the user after the vehicle is placed at the charging station.

"Contact" is a status in which charging of the storage battery of the vehicle in contact with a charging facility is selected. For example, "contact" is selected when the positioned and paired vehicle placed at a charging station is charged by coupling the charging station and the vehicle. For example, transition to "contact" is triggered by completion of the placement of the vehicle at the charging station after the vehicle is positioned and paired.

"Solar high voltage" is a status in which charging from a buffer battery to a high-voltage storage battery is selected. The buffer battery temporarily stores electric power generated in a solar power generation system. For example, "solar high voltage" is selected when the power storage amount (SOC) of the buffer battery reaches a predetermined threshold. For example, transition to "solar high voltage" is triggered by determination in the system that the power storage amount of the buffer battery reaches the threshold.

Figure 9:
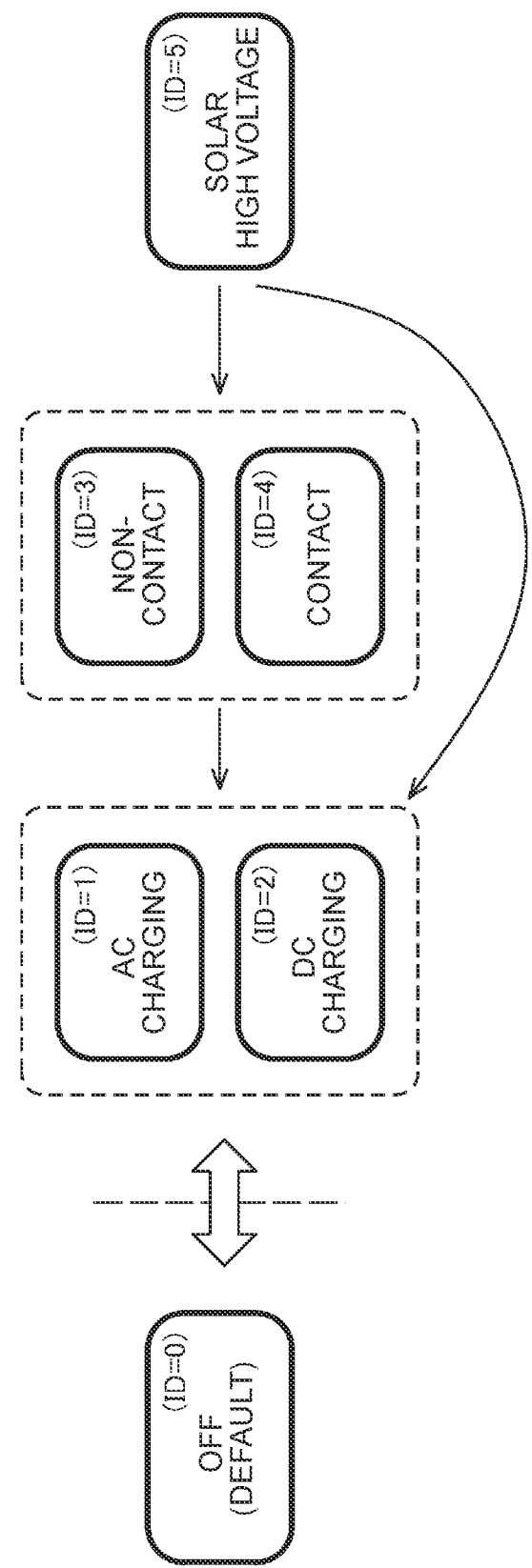
FIG. 9 is a status transition diagram in a charging sub-mode.

FIG. 9 is a status transition diagram among "OFF" ((ID=0) in FIG. 9), "AC charging" ((ID=1) in FIG. 9), "DC charging" ((ID=2) in FIG. 9), "non-contact" ((ID=3) in FIG. 9), "contact" ((ID=4) in FIG. 9), and "solar high voltage" ((ID=5) in FIG. 9) of the charging sub-mode. When a request for at least one of "AC charging", "DC charging", "non-contact", "contact", and "solar high voltage" is made in "OFF", "OFF" transitions to the requested charging status. When the charging requests are withdrawn, transition is made to "OFF". When a plurality of requests overlaps, "AC charging" and "DC charging" have the highest priority level, and "solar high voltage" has the lowest priority level. Selection of "AC charging" or "DC charging" depends on which one of their charging requests is made first (first-to-win). When the requests are made simultaneously, "DC charging" is selected. "Non-contact" and "contact" have an exclusive relationship and are not established simultaneously.

3-3: Equipment Power Supply Sub-mode

In the equipment power supply sub-mode, individual statuses transition under the automobile mode, the electric mode, and the generator mode. Possible vehicle statuses in the equipment power supply sub-mode include "OFF", "electric service", "movement preparation", "loading and unloading of passengers", and "OTA". "OFF" is a default status when services related to equipment power supply are not carried out. "Electric service", "movement preparation", "loading and unloading of passengers", and "OTA" are statuses in which the services related to equipment power supply are carried out as follows.

"Electric service" is a status in which provision of a unique service using the vehicle for a purpose other than traveling is selected. "Electric service" is selectable in all of the automobile mode, the electric mode, and the generator mode. Examples of the unique service involving selection of "electric service" include services using a watchover function and a connected vehicle function.

"Movement preparation" is a status in which provision of a unique service dedicated to preparation before the vehicle travels is selected. "Movement preparation" is selectable only in the electric mode (or the automobile mode in a case where transition is continuously made from "electric service" to "loading and unloading of passengers"). Examples of the unique service involving selection of "movement preparation" include a service using a pre-air conditioning function.

"Loading and unloading of passengers" is a status in which provision of a unique service dedicated to timings before and after a door opening/closing operation in the vehicle traveling is selected. "Loading and unloading of passengers" is selectable in all of the automobile mode, the electric mode, and the generator mode. Examples of the unique service involving selection of "loading and unloading of passengers" include services using an electronic mirror function and a hospitality function.

"OTA" is a status in which provision of reprogramming by wireless communication is selected. "OTA" is selectable only in the electric mode. "OTA" is selected on the premise that all other services are halted.

Figure 10:
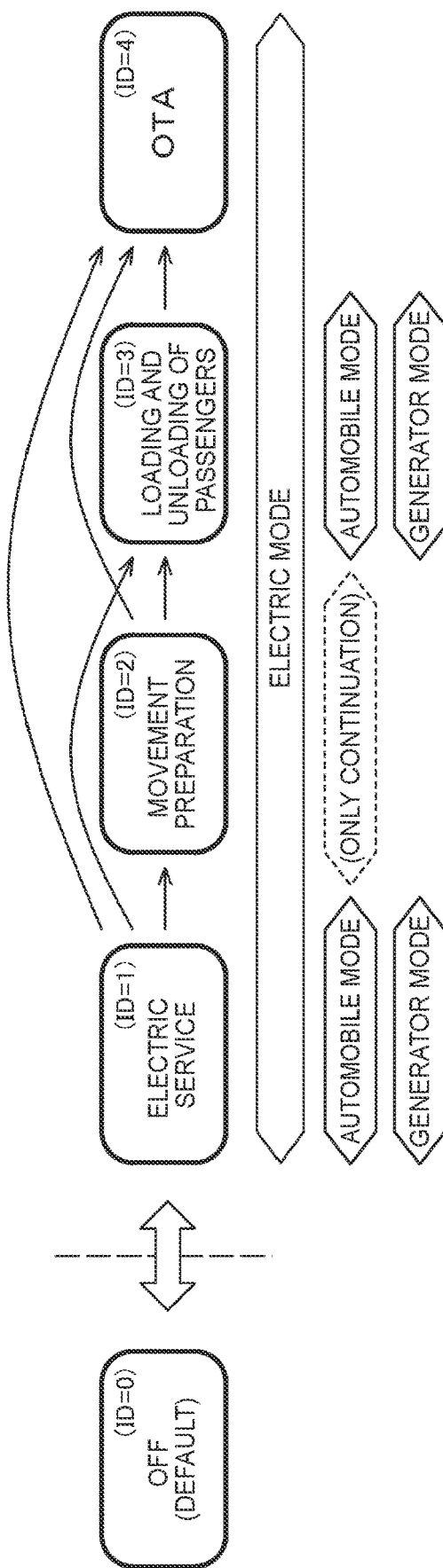
FIG. 10 is a status transition diagram in an equipment power supply sub-mode.

FIG. 10 is a status transition diagram among "OFF" ((ID=0) in FIG. 10), "electric service" ((ID=1) in FIG. 10), "movement preparation" ((ID=2) in FIG. 10), "loading and unloading of passengers" ((ID=3) in FIG. 10), and "OTA" ((ID=4) in FIG. 10) of the equipment power supply sub-mode. When a request for at least one of "electric service", "movement preparation", "loading and unloading of passengers", and "OTA" is made in "OFF", "OFF" transitions to a status in which the requested service can be provided. When service provision requests are withdrawn, transition is made to "OFF". When a plurality of requests overlaps, "OTA" has the highest priority level, and the other statuses have priority levels in ascending order of "loading and unloading of passengers", "movement preparation", and "electric service" under a condition that an upper level is inclusive of a lower level.

3-4: Auxiliary-Device Supplementation Sub-Mode

In the auxiliary-device supplementation sub-mode, individual statuses transition under the automobile mode, the electric mode, and the generator mode. Possible vehicle statuses in the auxiliary-device supplementation sub-mode include "OFF", "high-voltage transfer", and "solar low voltage". "OFF" is a default status when the vehicle is not charged. "High-voltage transfer" and "solar low voltage" are the following vehicle charging statuses.

"High-voltage transfer" is a status in which a power transfer process is selected. In the power transfer process, electric power is transferred from a high-voltage battery to an auxiliary-device battery because the charge level of the auxiliary-device battery decreases while the vehicle is parked for a long period. "High-voltage transfer" is selectable only in the electric mode. The power transfer function using the high-voltage battery is premised on the system autonomously being activated without an instruction from the user or the like.

"Solar low voltage" is a status in which charging from a buffer battery to the high-voltage storage battery is selected. The buffer battery temporarily stores electric power generated in the solar power generation system while the vehicle is parked. "Solar low voltage" is selectable in all of the automobile mode, the electric mode, and the generator mode. The function of charging from the buffer battery to the high-voltage storage battery is premised on the system detecting that the power storage amount (SOC) of the buffer battery reaches a predetermined threshold being autonomously activated.

Figure 11:
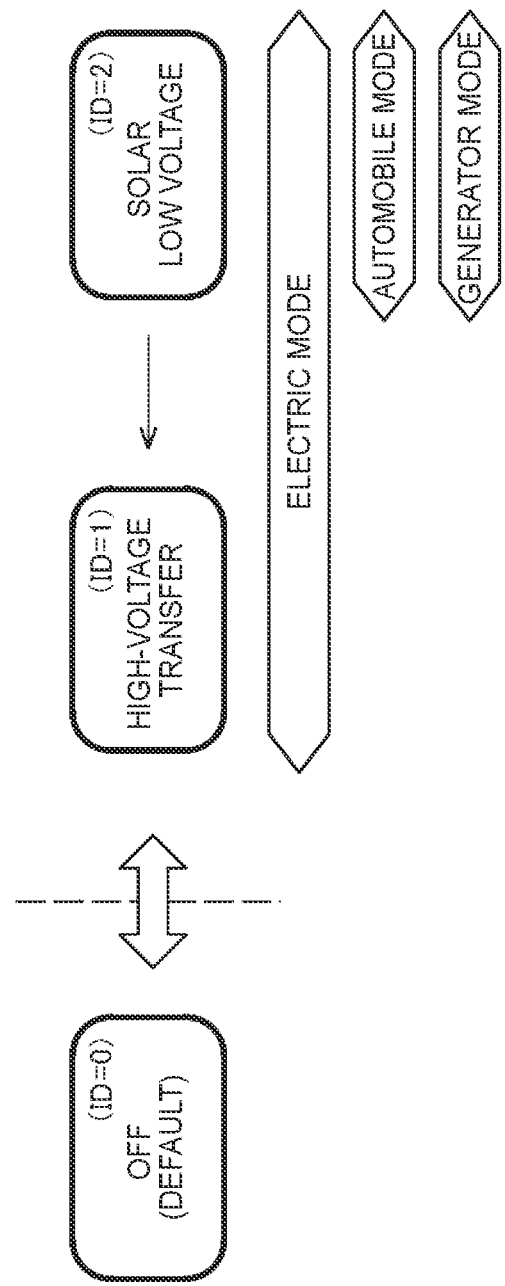
FIG. 11 is a status transition diagram in an auxiliary-device supplementation sub-mode.

FIG. 11 is a status transition diagram among "OFF" ((ID=0) in FIG. 11), "high-voltage transfer" ((ID=1) in FIG. 11), and "solar low voltage" ((ID=2) in FIG. 11) of the auxiliary-device supplementation sub-mode. When a request for at least one of "high-voltage transfer" and "solar low voltage" is made in "OFF", "OFF" transitions to a status in which the requested charging can be provided. When charging requests are withdrawn, transition is made to "OFF". When a plurality of requests overlaps, "high-voltage transfer" has a higher priority level than that of "solar low voltage".

3-5: AC Power Supply Sub-Mode

In the AC power supply sub-mode, individual statuses transition under the automobile mode, the electric mode, and the generator mode. Possible vehicle statuses in the AC power supply sub-mode include "OFF", "indoor ACC", "indoor V2L", "outdoor V2G", and "outdoor V2L". "OFF" is a default status when the vehicle is not charged. "Indoor ACC", "indoor V2L", "outdoor V2G", and "outdoor V2L" are the following vehicle charging statuses.

"Indoor ACC" is a status in which use of an accessory device is selected by the user through a dedicated switching (SW) operation. "Indoor ACC" is selectable in the automobile mode and the electric mode. "Indoor ACC" may be selected in combination with a unique parking service.

"Indoor V2L" is a status in which emergency power generation is selected through a unique command operation. "Indoor V2L" is selectable only in the generator mode. The start of the engine or the use of the fuel cell (FC) is permitted for the emergency power generation.

"Outdoor V2G" is a status in which AC charging or discharging cooperating with a building or system is selected based on an external command after a dedicated jig is inserted into the vehicle. "Outdoor V2G" is selectable only in the electric mode.

"Outdoor V2L" is a status in which emergency power generation is selected through a unique command operation after a dedicated jig is inserted into the vehicle. "Outdoor V2L" is selectable only in the generator mode. The start of the engine or the use of the fuel cell (FC) is permitted for the emergency power generation.

Figure 12:
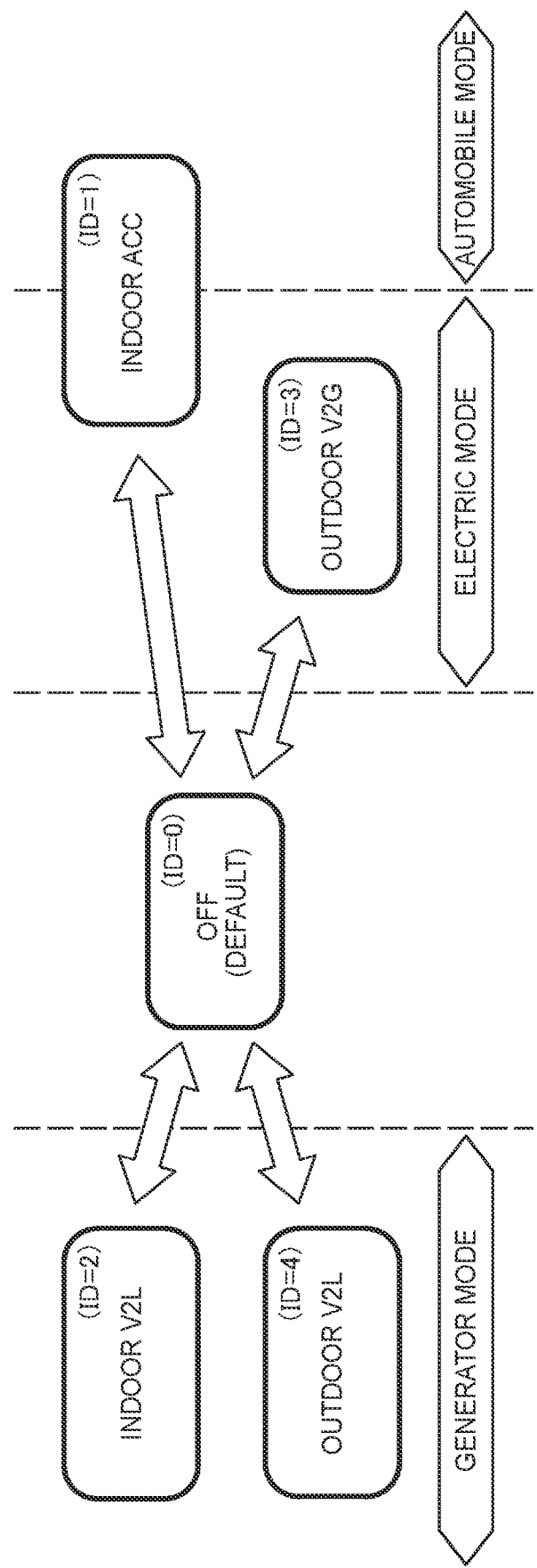
FIG. 12 is a status transition diagram in an alternating current (AC) power supply sub-mode.

FIG. 12 is a status transition diagram among "OFF" ((ID=0) in FIG. 12), "indoor ACC" ((ID=1) in FIG. 12), "indoor V2L" ((ID=2) in FIG. 12), "outdoor V2G" ((ID=3) in FIG. 12), and "outdoor V2L" ((ID=4) in FIG. 12) of the AC power supply sub-mode. When a request for at least one of "indoor ACC", "indoor V2L", "outdoor V2G", and "outdoor V2L" is made in "OFF", "OFF" transitions to the requested charging status. When charging requests are withdrawn, transition is made to "OFF".

SPECIFIC EXAMPLES

Referring further to FIG. 13 to FIG. 25, description is given of specific examples of status transition in which the main modes ("automobile", "electric", "generator", and "stop"), the states ("traveling", "motion", "transportation", and "electric power infrastructure cooperation"), and the sub-modes ("driving", "charging", "equipment power supply", "auxiliary-device supplementation", and "AC power supply") are associated with each other. In the following description, a status involving the main mode, the state, and the sub-mode is referred to as "mobility system status".

Example 1

FIG. 13 is a diagram illustrating a summary of an example of transition of the charging sub-mode and the AC power supply sub-mode associated with the electric power infrastructure cooperation state (Example 1). When no infrastructure cooperation instruction is given, the status is fixed in "standby". In response to an infrastructure cooperation instruction, transition is made to "ready", "charge", or "supply". During cooperation, "charge" and "supply" are switched through temporary intermediation of "ready". The same applies to a case where the vehicle cannot respond to the infrastructure cooperation instruction due to circumstances in the vehicle. In "(*1)" of FIG. 13, only charging is possible. In "(*1)" of FIG. 13, only discharging is possible.

Example 2

FIG. 14 is a diagram illustrating a summary of an example of switching of conditions to permit transition to "start" of the traveling state in each of the statuses of the driving sub-mode (Example 2). FIG. 14 illustrates conditions to determine whether to permit status transition from "standby" to "start" of the traveling state in "manual", "semi-automatic", and "full-automatic". In FIG. 14, "(*1)" applies to a case of remote operation from Out-car. In FIG. 14, "(*2)" is associated with a case where an occupant has a driver's license (for example, the elderly aged 75 or over).

Example 3

Figure 15:
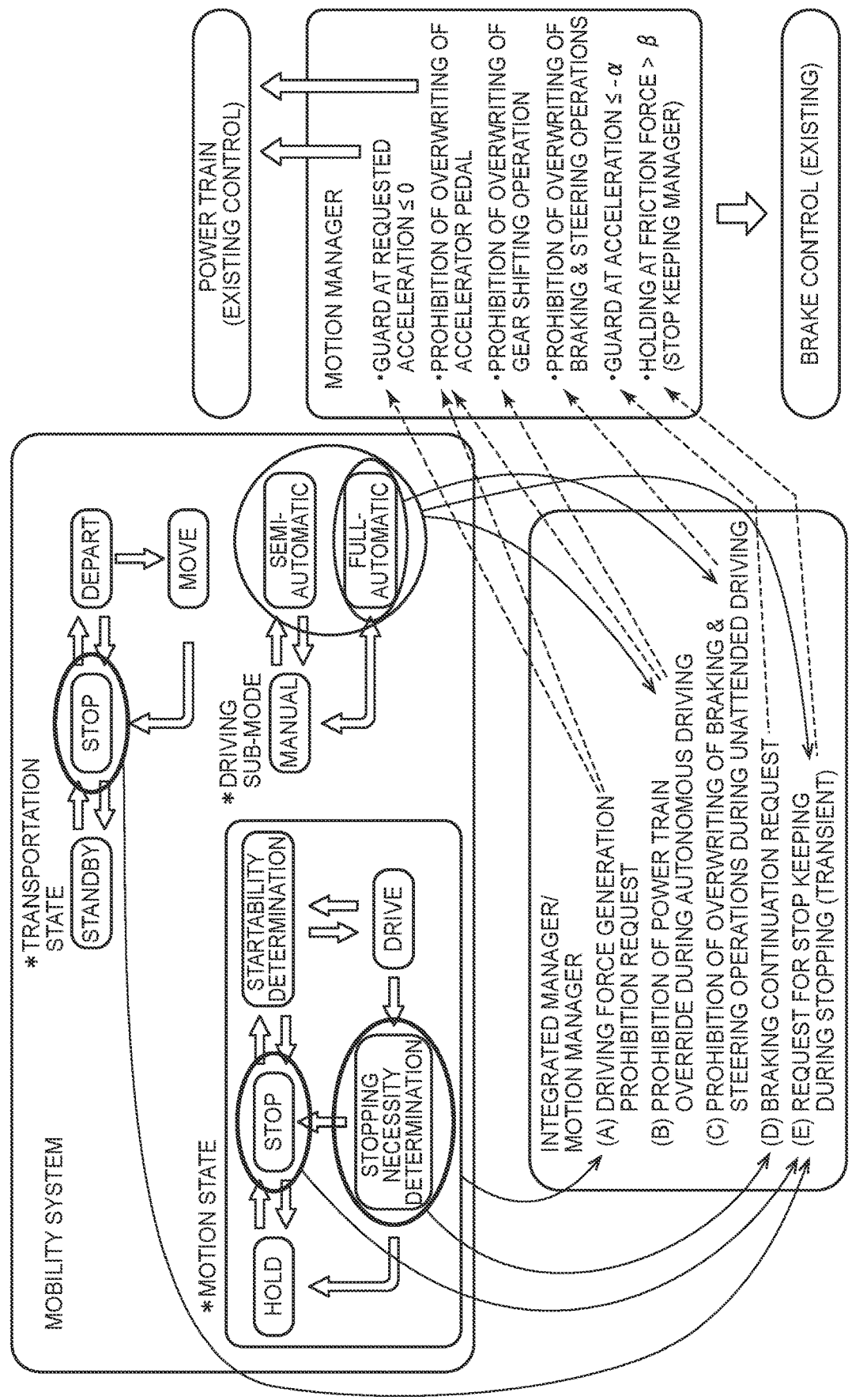
FIG. 15 illustrates Example 3 of status transition in which the main modes, the states, and the sub-modes are associated with each other.

FIG. 15 is a diagram illustrating a summary of an example of direct requests for the motion system in each of the statuses in the automobile mode (Example 3). As illustrated in FIG. 15, the overall behavior of the vehicle across a plurality of functions can centrally be controlled by inputting the mobility system status to managers (integrated manager and motion manager) that control the main functions. With the mobility system status, direct commands can be determined.

Example 4

Figure 16:
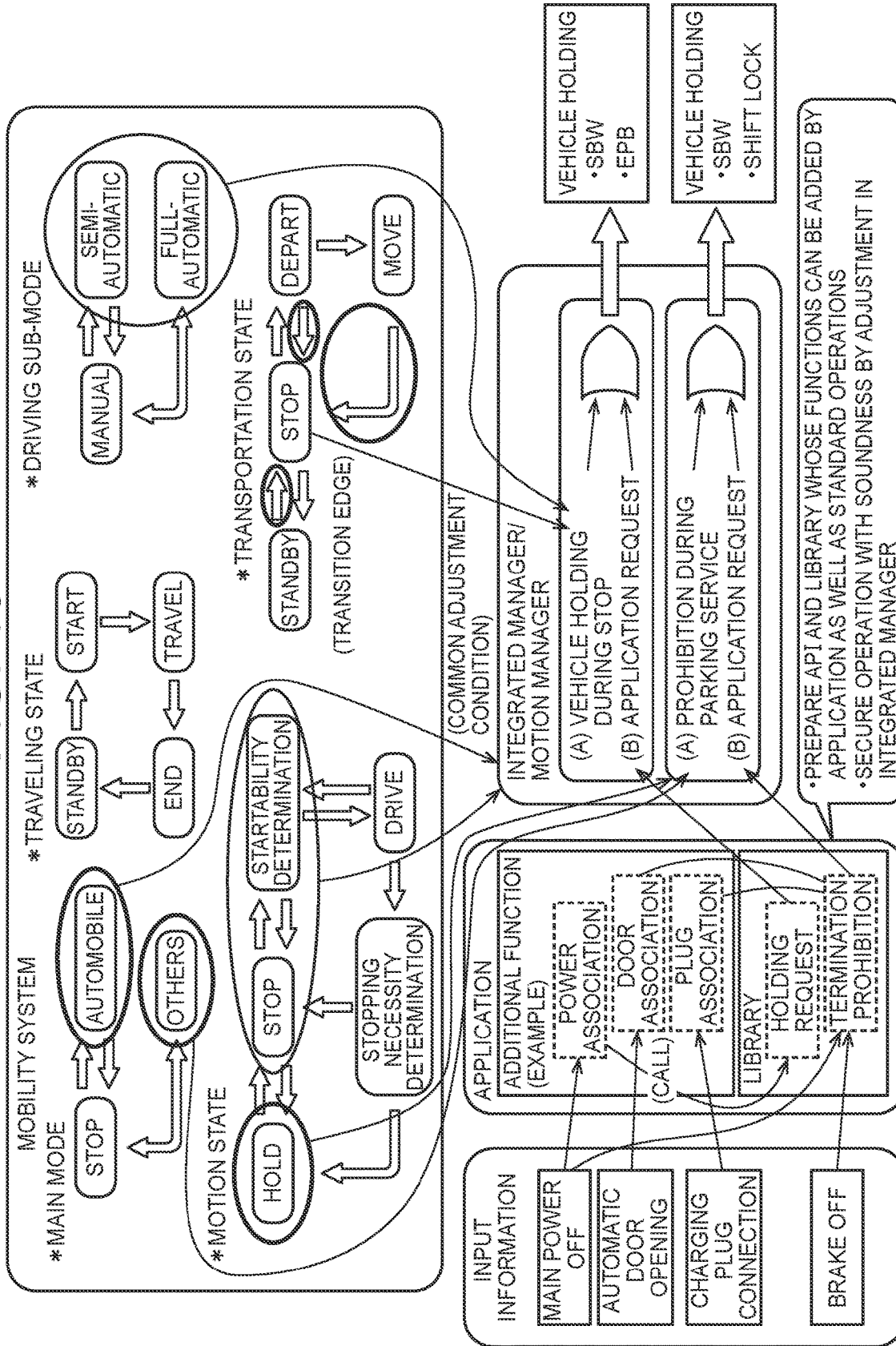
FIG. 16 illustrates Example 4 of status transition in which the main modes, the states, and the sub-modes are associated with each other.

FIG. 16 is a diagram illustrating a summary of an example of gate adjustment based on the mobility system status in response to a higher-level request in the automobile mode (Example 4). As illustrated in FIG. 16, the overall behavior of the vehicle across a plurality of functions can centrally be controlled by inputting the mobility system status to the managers (integrated manager and motion manager) that control the main functions. Outputs can be prohibited or limited by combining the mobility system status or arbitrary scene information with the higher-level operation request.

Example 5

Figure 17:
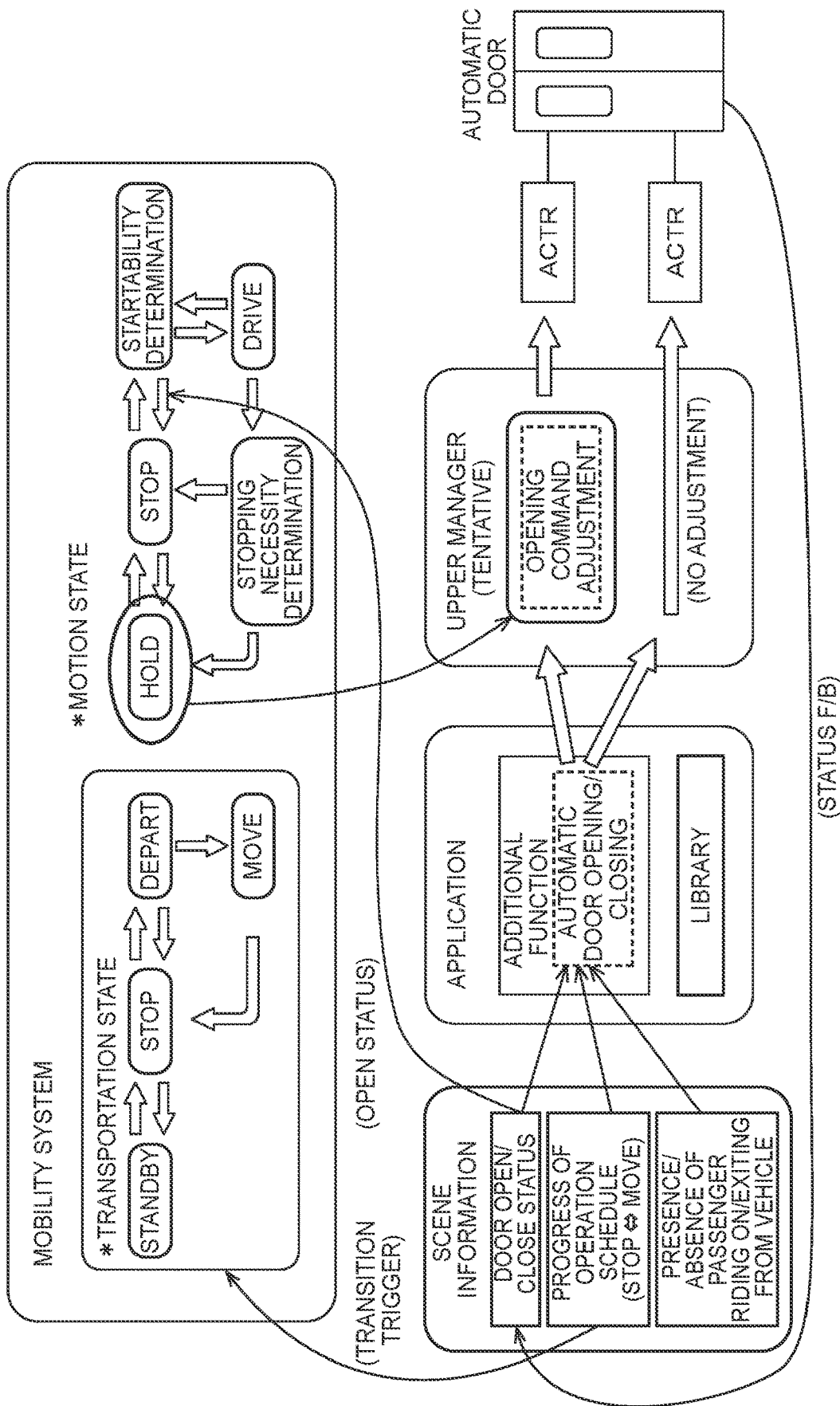
FIG. 17 illustrates Example 5 of status transition in which the main modes, the states, and the sub-modes are associated with each other.

FIG. 17 is a diagram illustrating a summary of an example of activity adjustment in a transportation service (Example 5). A basic flow of the transportation service is as follows. When the vehicle arrives at a station and any passenger is going to ride on or exit from the vehicle, the vehicle is held and then the automatic door is opened. Before departure, the automatic door is fully closed while the vehicle is waiting for departure. As illustrated in FIG. 17, the overall behavior of the vehicle across a plurality of functions can centrally be controlled by inputting the mobility system status to the managers that control the main functions. With the mobility system status, direct commands can be determined.

Example 6

Figure 18:
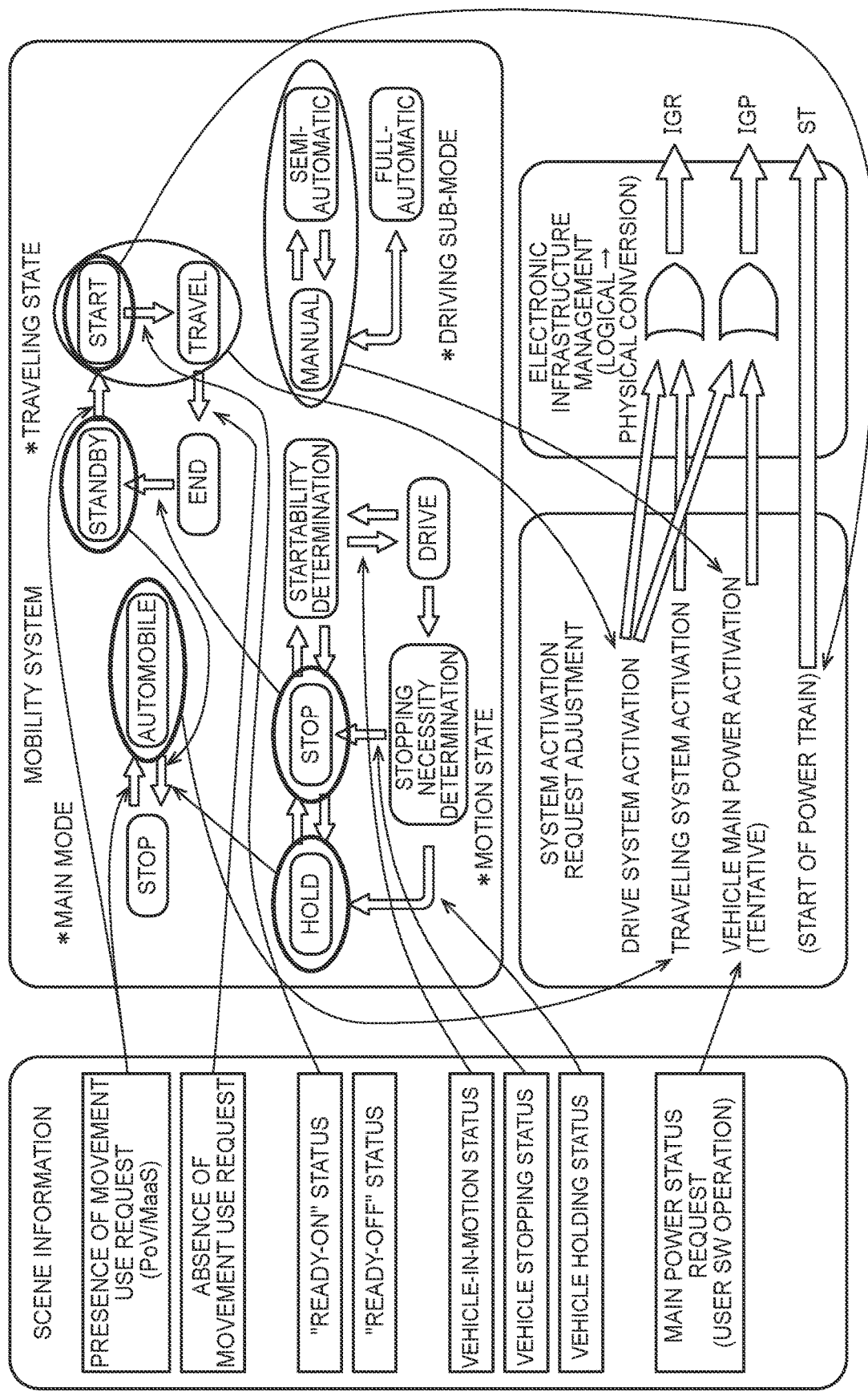
FIG. 18 illustrates Example 6 of status transition in which the main modes, the states, and the sub-modes are associated with each other.

FIG. 18 is a diagram illustrating a summary of an example of power supply adjustment in the automobile mode based on the mobility system status and scene information (Example 6). As illustrated in FIG. 18, the overall behavior of the vehicle across a plurality of functions can centrally be controlled by inputting the mobility system status to the managers that control the main functions. With the mobility system status, direct commands can be determined. Outputs can be prohibited or limited by combining the mobility system status or arbitrary scene information with a higher-level operation request.

Example 7

FIG. 19 is a diagram illustrating a summary of an example of combinations of status transition among the sub-modes through charging/discharging request adjustment (Example 7). In FIG. 19, the statuses of the charging sub-mode are illustrated in columns, and the statuses of the equipment power supply sub-mode and the auxiliary-device supplementation sub-mode are illustrated in rows. Each combination shows that only charging can be executed, only discharging can be executed, or charging and discharging can be co-executed.

When the equipment power supply sub-mode is "OTA" and the charging sub-mode is "AC charging" or "DC charging" ((*1) in FIG. 19), traveling-based equipment drive is not applied during charging involving plug connection. Transition is permitted after the plug is removed. When the equipment power supply sub-mode is not "OFF" and the charging sub-mode is "solar high voltage" ((*2) in FIG. 19), solar charging is not applied because of a strong probability that a loss during power transfer increases as compared to charging power. When the charging sub-mode is "solar high voltage" ((*3) in FIG. 19), a high-voltage side of the solar system has a higher priority level because high-voltage charging and low-voltage supplementation have an exclusive relationship. When the auxiliary-device supplementation sub-mode is "high-voltage transfer" and the charging sub-mode is "AC charging", "DC charging", "non-contact", or "contact" ((*4) in FIG. 19), only power transfer is executed if the selected charging system is a reprogramming target. To avoid failure in reprogramming due to power outage, the reprogramming is executed in every case after necessary energy is prestored. When the auxiliary-device supplementation sub-mode is "solar low voltage" and the charging sub-mode is "AC charging", "DC charging", "non-contact", or "contact" ((*5) in FIG. 19), boosted supplementation using a main DC/DC converter (DDC) is expected even during normal charging in case of a decrease in the charge level of the auxiliary-device battery. When the charging sub-mode is "AC charging", "DC charging", "non-contact", or "contact" ((*6) in FIG. 19), it is premised that simultaneous driving of an existing DDC and a solar power transfer DDC is permitted similarly to traveling. When the equipment power supply sub-mode is "movement preparation" and the charging sub-mode is "non-contact" or "contact" ((*7) in FIG. 19), rejection may be necessary for a service in which a specific user rides on the vehicle (such as private room charging). When the equipment power supply sub-mode is "OTA" and the charging sub-mode is "non-contact" or "contact" ((*8) in FIG. 19), suspension of non-contact charging may be necessary before and after a driver rides on the vehicle for traveling.

FIG. 20 illustrates adjustment requirements between the equipment power supply sub-mode and the auxiliary-device supplementation sub-mode. When the equipment power supply sub-mode is "OTA", the equipment power supply has priority. When the equipment power supply sub-mode is not "OTA", the equipment power supply and the auxiliary-device supplementation can be co-executed. Every determination as to whether to execute each type of power supply and the high-voltage transfer finally depends on demand-supply adjustment based on priority ranks. Co-execution of the power supply and the solar low voltage can seamlessly be continued after transition to traveling. Through the co-execution in the mobility system, effective use of energy can be expected when the buffer battery is abolished.

Example 8

FIG. 21 is a diagram illustrating a summary of an example of adjustment requirements in combinations of the AC power supply sub-mode and the other charging/discharging sub-modes (Example 8). In FIG. 21, the statuses of the AC power supply sub-mode are illustrated in columns, and the statuses of the charging sub-mode, the equipment power supply sub-mode, and the auxiliary-device supplementation sub-mode are illustrated in rows. In FIG. 21, "A" to "H" represent the following items.

A in FIG. 21: Charging and discharging can be co-executed
B in FIG. 21: Only charging or discharging can be executed
C in FIG. 21: Only AC power supply can be executed
D in FIG. 21: Exclusive (first-to-win)
E in FIG. 21: Discharging-side transition is permitted during AC power generation (reverse transition is not permitted)
F in FIG. 21: Exclusive (switched as appropriate)
G in FIG. 21: Co-executable only during a specific "electric service" (only charging or discharging can be executed in other cases)
H in FIG. 21: Transition to AC is permitted only when "movement preparation" is not executed (exclusive or first-to-win in other cases)

In FIG. 21, "NOTHING" indicates that no combination exists. Parenthesized "Co-executable" ((A) in FIG. 21) indicates that transition is permitted in the mobility system and determination is finally made through priority adjustment among activities by the power manager of the integrated manager or based on whether a request can be made based on scene information on an activity side.

Example 9

Figure 22:
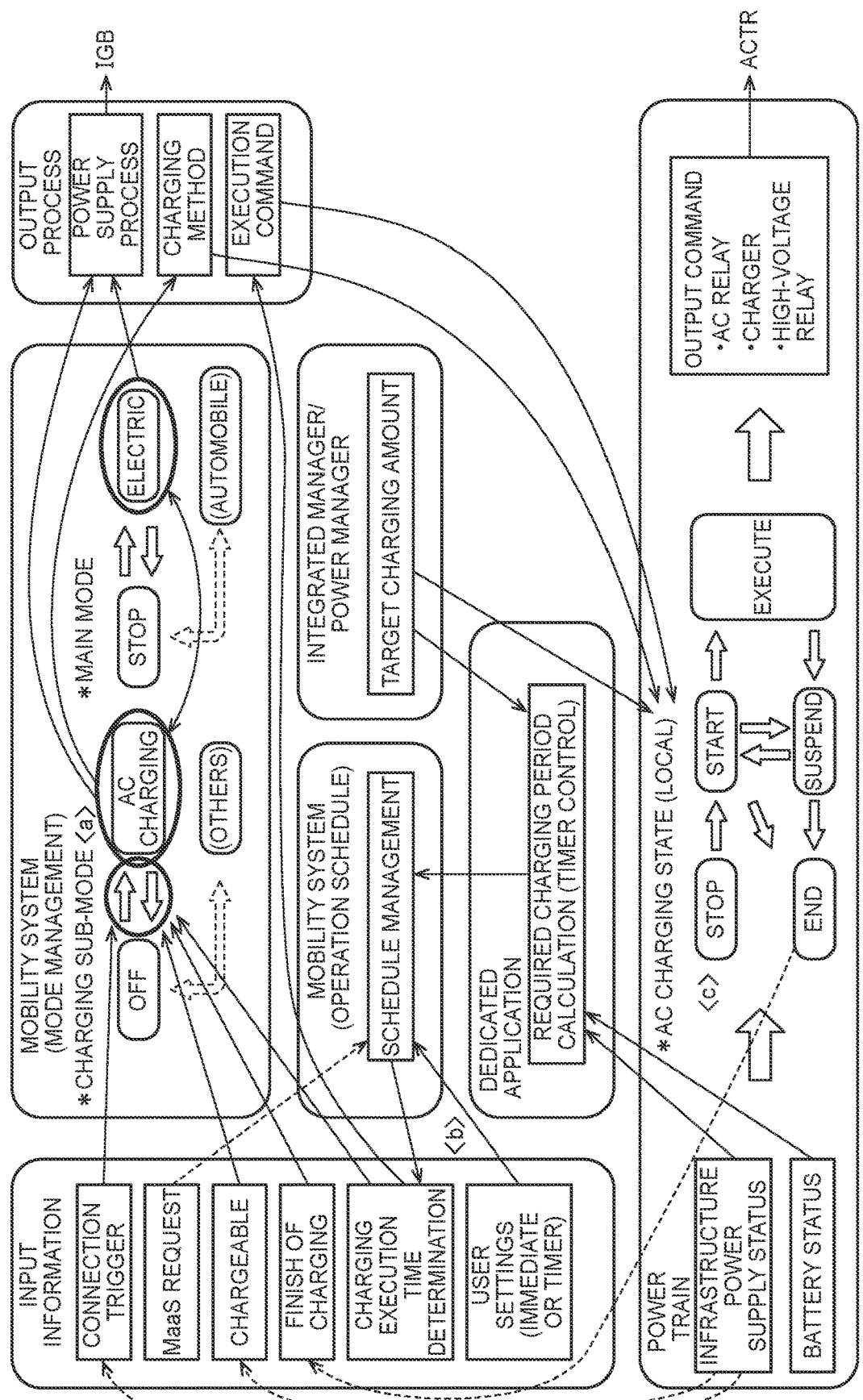
FIG. 22 illustrates Example 9 of status transition in which the main modes, the states, and the sub-modes are associated with each other.

FIG. 22 illustrates an example of an AC charging control flow (Example 9).

<a> in FIG. 22: A mode is started in response to edge detection of a charging plug connecting operation or a time setting notification from schedule management during connection. Therefore, an IGB signal is output, and a power train charging system is activated. When a default charging timer is enabled and a time has not come, operation is executed up to AC relay connection after the edge detection to calculate a required period.

<b> in FIG. 22: In response to a timer request, activation is scheduled by calculating a required period based on infrastructure, a battery condition, and a target charging amount. When the time is insufficient immediately after connection, activation is executed immediately.

<c> in FIG. 22: In response to transmission of a charging method selection result and reception of an execution request, execution of charging is managed in the power train (including transition to suspension due to power outage or plug removal). After the charging is completed or the suspension is confirmed, the result is transmitted to the mobility system and the control mode is terminated.

Example 10

Figure 23:
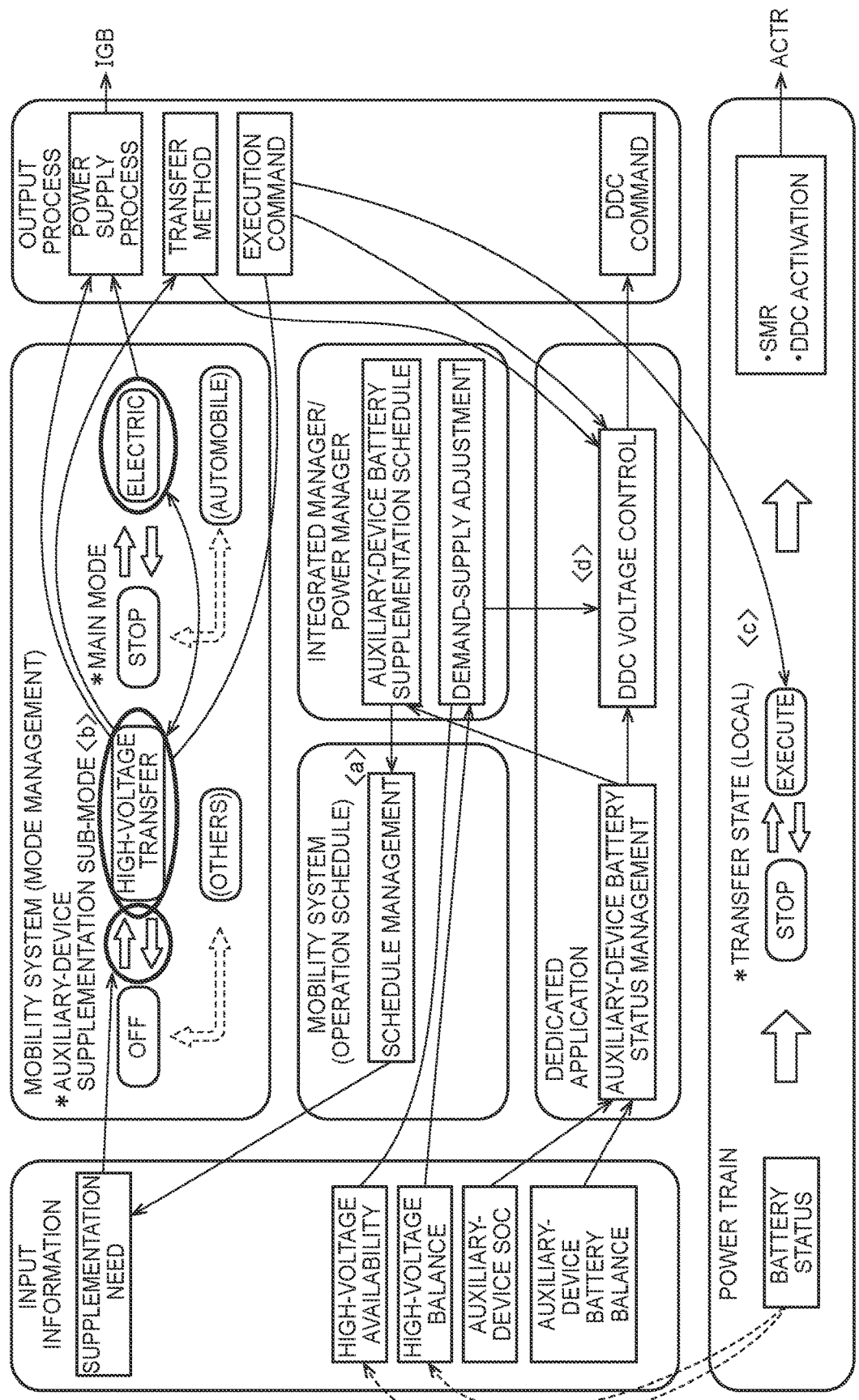
FIG. 23 illustrates Example 10 of status transition in which the main modes, the states, and the sub-modes are associated with each other.

FIG. 23 illustrates an example of a high-voltage auxiliary-device battery supplementation control flow (Example 10).
<a> in FIG. 23: After a VPP execution request is received from infrastructure, the switching state transitions to "ready" and the main mode is switched to "electric".
<b> in FIG. 23: The charging/discharging method is recognized as AC based on information from the connected infrastructure.
<c> in FIG. 23: In response to an infrastructure request, the charging sub-mode is switched to "AC charging" to execute charging.
<d> in FIG. 23: After the charging is finished, the switching state is returned to "ready". The same applies to a case where a suspension request is given from the infrastructure.

When a power supply request is given from the infrastructure, the AC power supply sub-mode is switched to "outdoor V2G".

Similarly to the charging, the switching state is returned to "ready" and the power supply is finished. The mode is completed in "standby" as appropriate through time guard or the like. By setting the charging/discharging switching state, exclusive adjustment of the charging and the power supply can be executed to avoid control interference.

Example 11

Figure 24:
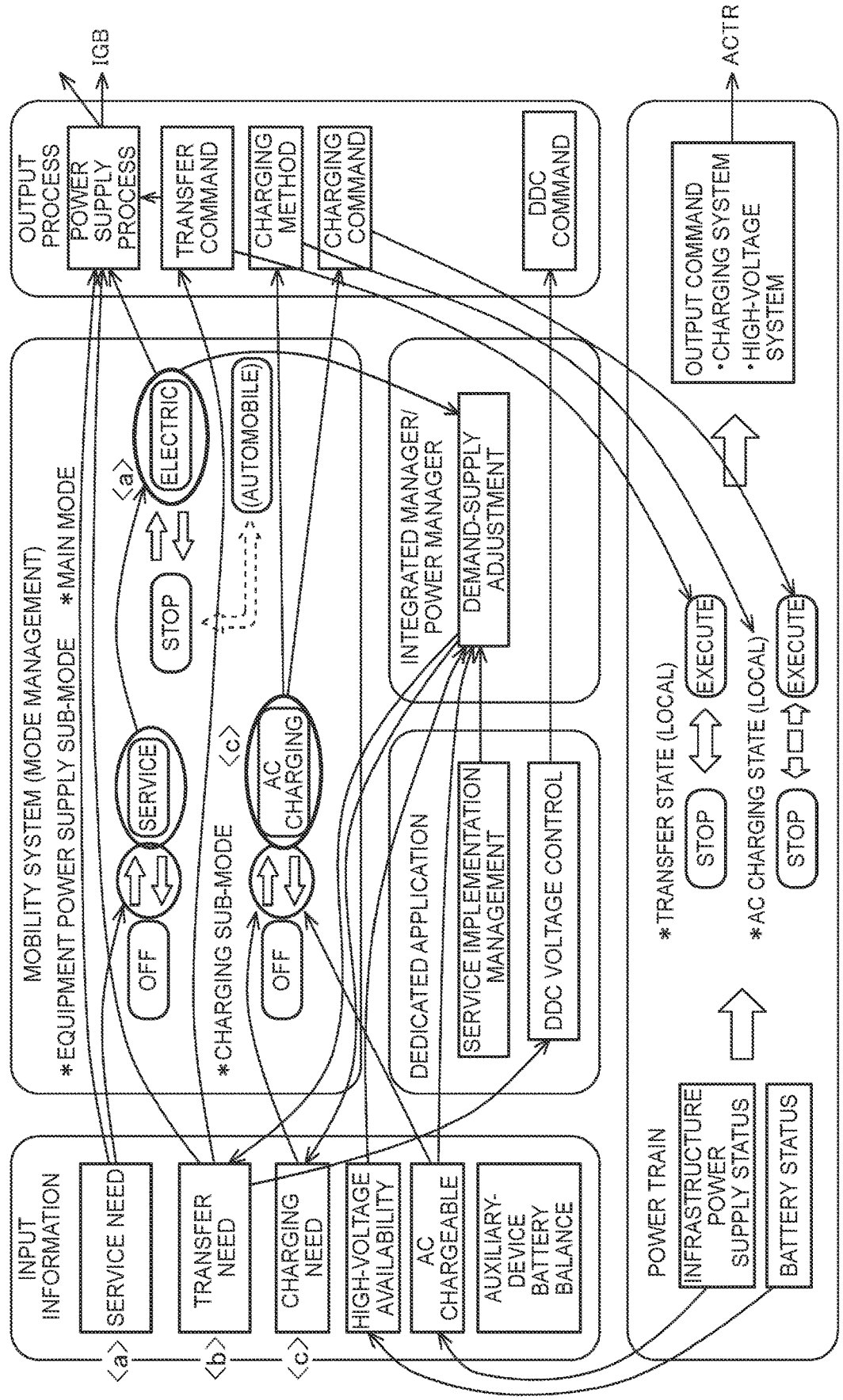
FIG. 24 illustrates Example 11 of status transition in which the main modes, the states, and the sub-modes are associated with each other.

FIG. 24 illustrates an example of a complex control flow involving a parking service, high-voltage transfer, and AC charging (Example 11).

<a> in FIG. 24: When a service need arises, the equipment power supply sub-mode is switched to "electric service" and the electric mode is started. Power is supplied based on the requested service.

\<b\> in FIG. 24: When the use of high voltage is permitted through adjustment in the power manager of the integrated manager, power transfer is commanded and IGB is activated.

\<c\> in FIG. 24: When the AC charging is possible and AC power supply is permitted through adjustment in the power manager of the integrated manager, the charging sub-mode is switched to "AC charging" and the AC charging is executed in parallel by outputting a charging command.

Example 12

Figure 25:
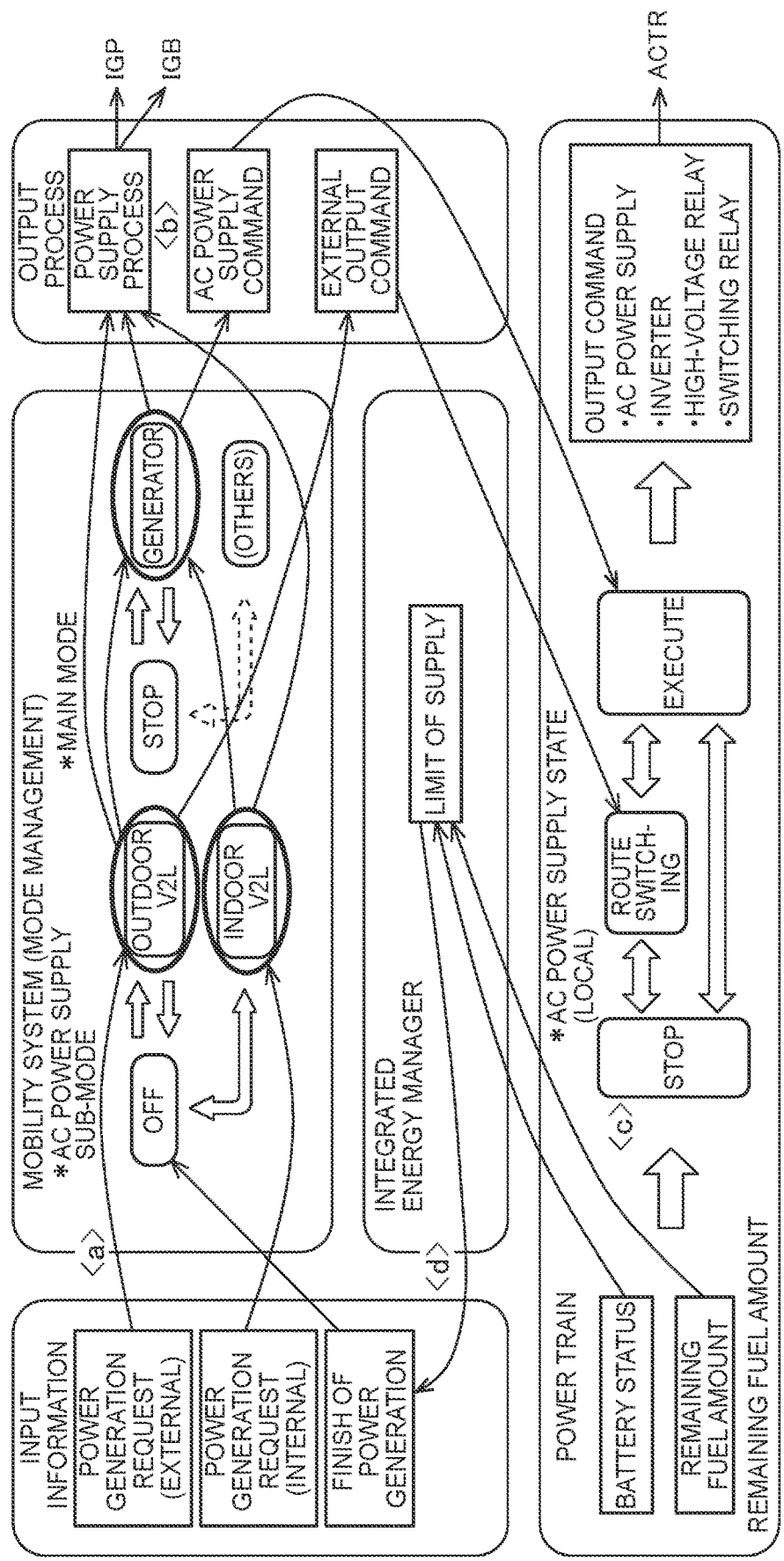
FIG. 25 illustrates Example 12 of status transition in which the main modes, the states, and the sub-modes are associated with each other.

FIG. 25 illustrates an example of an emergency power generation control flow (Example 12).

\<a\> in FIG. 25: In response to a power generation request given through a user operation, the AC power supply sub-mode is switched to "outdoor V2L" or "indoor V2L". The main mode is switched from "OFF" to "(emergency) generator".

\<b\> in FIG. 25: An output processor outputs an IGP signal, and the power train system is activated. An AC power supply command is output simultaneously. In a case of external power supply, an IGB signal for activating the charging system and an external output command for switching relays are output as well.

\<c\> in FIG. 25: In response to the higher-level power supply and output commands, the request is fulfilled in a power train domain.

\<d\> in FIG. 25: Even if the request is not withdrawn through a user operation, the service is terminated at the limit of supply.

Effects etc.

As described above, the information processing device according to the embodiment of the present disclosure includes in advance various commands, as the library, that can automatically determine, by simply calling predetermined abstract commands in a control architecture that can implement activities, the complex actuator operation adjustment, the power supply activation for activating a necessary system, the energy supply adjustment responding to energy demand (possibility determination and energy source selection), and the mode switching for determining the overall behavior of the vehicle.

Thus, application developers can easily develop a new or additional application (service) by designing an algorithm intuitively for its purpose without being aware of, for example, the structure of the electronic platform in the vehicle, the defined commands, the system configuration (hardware variations), and the energy system.

In the information processing device according to this embodiment, any function can be added by simply referring to the information in the sharing portal, using the command library, and installing a new or additional application alone without the need to revise related applications.

The application developers can easily develop a new or additional application.

In the information processing device according to this embodiment, it is possible to avoid an increase in the number of inspection steps to find malfunction due to unexpected behavior of the vehicle or the number of inspection steps to check control interference through the behavior of the input/output interfaces (I/Fs) in the hierarchical structure.

In the information processing device according to this embodiment, the control condition of the vehicle can centrally be managed through the status transition using the modes and states. Thus, the overall vehicle can appropriately be controlled without causing inconsistency among the operations of the functions of the different functional systems.

Although the technology of the present disclosure is described above based on the embodiment, the present disclosure can be regarded not only as the information processing device, but also as, for example, a method to be executed by the information processing device including a processor and a memory, a program for the method, a non-transitory computer-readable recording medium storing the program, or a vehicle including the information processing device.

The present disclosure is useful in an information processing device to be mounted on a vehicle or the like.

What is claimed is:

1. An information processing device to be mounted on a vehicle, the information processing device comprising a processor configured to:
   determine one mode out of a plurality of modes defining behavior of the vehicle in response to receiving a request for the vehicle, the request instructing execution of two or more functions respectively from a plurality of different functional systems included in the vehicle;
   make transition of a status of the vehicle among a plurality of statuses that is permitted in the determined mode; and
   control, for fulfilling the request, the execution of the two or more functions respectively from the plurality of different functional systems included in the vehicle based on the status of the vehicle that has been achieved by the transition.

2. The information processing device according to claim 1, wherein a condition for the processor to make the transition of the status of the vehicle depends on the determined mode.

3. A method to be executed by a processor of an information processing device to be mounted on a vehicle, the method comprising:
   determining one mode out of a plurality of modes defining behavior of the vehicle in response to receiving a request for the vehicle, the request instructing execution of two or more functions respectively from a plurality of different functional systems included in the vehicle;
   making transition of a status of the vehicle among a plurality of statuses that is permitted in the determined mode; and
   controlling, for fulfilling the request, the execution of the two or more functions respectively from the plurality of different functional systems included in the vehicle based on the status of the vehicle that has been achieved by the transition.

4. A non-transitory storage medium storing instructions that are executable by one or more processors of an information processing device to be mounted on a vehicle and that cause the one or more processors to perform functions comprising:
   determining one mode out of a plurality of modes defining behavior of the vehicle in response to receiving a request for the vehicle, the request instructing execution of two or more functions respectively from a plurality of different functional systems included in the vehicle;

making transition of a status of the vehicle among a plurality of statuses that is permitted in the determined mode; and controlling, for fulfilling the request, the execution of the two or more functions respectively from the plurality of different functional systems included in the vehicle based on the status of the vehicle that has been achieved by the transition.

5. A vehicle comprising the information processing device according to claim 1.

6. The method according to claim 3, wherein a condition to make the transition of the status of the vehicle depends on the determined mode.

7. The non-transitory storage medium according to claim 4, wherein a condition to make the transition of the status of the vehicle depends on the determined mode.

* * * * *